US009254462B2

(12) United States Patent
Iijima et al.

(10) Patent No.: US 9,254,462 B2
(45) Date of Patent: Feb. 9, 2016

(54) RECLAIMING APPARATUS AND RECLAIMING METHOD

(75) Inventors: Masaki Iijima, Tokyo (JP); Masahiko Tatsumi, Hyogo (JP); Yasuyuki Yagi, Hyogo (JP); Kouki Ogura, Hyogo (JP)

(73) Assignees: MITSUBISHI HEAVY INDUSTRIES LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 228 days.

(21) Appl. No.: 13/703,211

(22) PCT Filed: Jul. 26, 2011

(86) PCT No.: PCT/JP2011/066968
§ 371 (c)(1),
(2), (4) Date: Dec. 10, 2012

(87) PCT Pub. No.: WO2012/029447
PCT Pub. Date: Mar. 8, 2012

(65) Prior Publication Data
US 2013/0087041 A1    Apr. 11, 2013

(30) Foreign Application Priority Data

Sep. 2, 2010   (JP) ................................. 2010-196950

(51) Int. Cl.
*B01D 19/00* (2006.01)
*B01D 53/14* (2006.01)

(52) U.S. Cl.
CPC ........ *B01D 53/1425* (2013.01); *B01D 19/0005* (2013.01); *B01D 53/1412* (2013.01);
(Continued)

(58) Field of Classification Search
CPC ........... B01D 19/0005; B01D 53/1412; B01D 53/1425; B01D 53/1462; Y02C 10/06; Y02C 10/08
See application file for complete search history.

(56) References Cited

U.S. PATENT DOCUMENTS 3,554,690 A * 1/1971 Mayland ........................ 423/229
3,829,521 A * 8/1974 Green ................................ 5/161
(Continued)

FOREIGN PATENT DOCUMENTS

CN    101301578 A    11/2008
EA       009089 B1    10/2007
(Continued)

OTHER PUBLICATIONS

TLV "Types of Steam", Jun. 12, 2011, All pages. https://web.archive.org/web/20110612154213/http://www.tly.com/global/TI/steam-theory/types-of-steam.html.*

(Continued)

*Primary Examiner* — Amber R Orlando
*Assistant Examiner* — Britanny Precht
(74) *Attorney, Agent, or Firm* — Westerman, Hattori, Daniels & Adrian, LLP

(57) ABSTRACT

In a reclaiming apparatus (106) that includes an airtight container (106a) as an absorbent storing unit that stores a part of an absorbent that absorbs $CO_2$ included in an exhaust gas and a heating unit that heats the absorbent stored in the airtight container (106a), a part of the absorbent stored in the airtight container (106a) is distributed, and a gaseous body is brought into counterflow contact with the absorbent that is distributed. As a result, since the gaseous body is brought into counterflow contact with a part of the absorbent stored in the absorbent storing unit, an absorbent component volatilizes and is separated from a degraded material, and the absorbent component can be extracted from the degraded material, whereby a loss of the absorbent can be reduced.

11 Claims, 10 Drawing Sheets

(52) U.S. Cl.
CPC ............. *B01D53/1462* (2013.01); *Y02C 10/06* (2013.01); *Y02C 10/08* (2013.01); *Y10S 502/517* (2013.01); *Y10S 502/518* (2013.01)

(56) References Cited

U.S. PATENT DOCUMENTS

| | | | | |
|---|---|---|---|---|
| 3,918,934 | A * | 11/1975 | Kriebel et al. | 95/166 |
| 4,460,383 | A * | 7/1984 | Valerius | 203/1 |
| 4,461,749 | A * | 7/1984 | Thorn | 423/228 |
| 5,389,208 | A * | 2/1995 | Beasley et al. | 203/11 |
| 8,425,849 | B2 * | 4/2013 | Iijima et al. | 422/144 |
| 8,603,226 | B2 * | 12/2013 | Garcia Andarcia et al. | 95/236 |
| 8,927,450 | B2 * | 1/2015 | Iijima et al. | 502/55 |
| 2007/0148068 | A1 * | 6/2007 | Burgers et al. | 423/220 |
| 2008/0203036 | A1 * | 8/2008 | Iijima et al. | 210/798 |
| 2009/0155889 | A1 | 6/2009 | Handagama et al. | |
| 2010/0115839 | A1 * | 5/2010 | Brown et al. | 48/127.3 |
| 2010/0192770 | A1 * | 8/2010 | Andarcia et al. | 95/92 |
| 2011/0088553 | A1 * | 4/2011 | Woodhouse et al. | 95/162 |
| 2011/0092355 | A1 * | 4/2011 | Iijima et al. | 502/55 |
| 2013/0206000 | A1 * | 8/2013 | Iijima et al. | 95/19 |

FOREIGN PATENT DOCUMENTS

| | | | |
|---|---|---|---|
| EP | 1059109 | A2 | 12/2000 |
| EP | 1059110 | A1 | 12/2000 |
| JP | 49-057002 | A | 6/1974 |
| JP | 5-245339 | A | 9/1993 |
| RU | 2 122 888 | C1 | 12/1998 |
| RU | 2 126 863 | C1 | 2/1999 |
| RU | 2371237 | C1 | 10/2009 |

OTHER PUBLICATIONS

Efunda "Steam Tables" for 2 and 3 kg/cm2, Sep. 20, 2014, all pages. http://www.efunda.com/materials/water/steamtable_sat.cfm.*

Written Opinion for PCT/JP2011/066968, mailing date of Oct. 25, 2011.

International Search Report for PCT/JP2011/066968, mailing date of Oct. 25, 2011.

Australian Notice of Acceptance dated Jun. 23, 2014, issued in related Australian Patent Application No. 2011297370 (3 pages).

Russian Decision of Grant dated Jul. 9, 2014, issued in related Russian Patent Application No. 2013100167, w/ English translation, (17 pages).

European Search Report dated Feb. 2, 2011, issued in European Patent Application No. 10160471.8, corresponding to U.S. Pat. No. 8,425,849 and U.S. Appl. No. 13/843,228 (U.S. Publication No. 2013/0206000).

Notice of Allowance dated Sep. 6, 2012, issued in corresponding Canadian Patent Application No. 2,700,781 (1 page).

Official Decision of Grant dated dated Jun. 28, 2011, issued in corresponding Russian Patent Application No. 2010115798 and Substitute sheet of Official Decision of Grant correcting "EP 105109A2" to "EP 1059109 A2" error, corresponding to U.S. Pat. No. 8,425,849 and U.S. Appl. No. 13/843,228 (U.S. Publication No. 2013/0206000) (16 pages).

Restriction Election dated Sep. 26, 2012, issued in U.S. Appl. No. 12/752,405 (6 pages).

Notice of Allowance and Fees Due dated Dec. 20, 2012, issued in U.S. Appl. No. 12/752,405 ( U.S. Pat. No. 8,425,849) (19 pages).

Notice of Allowance and Fees Due dated May 19, 2014, issued in U.S. Appl. No. 13/843,228 (12 pages).

English Translation of Written Opinion of PCT/JP2011/066968, mailing date of Oct. 25, 2011. (6 pages).

US Notice of Allowance dated Sep. 2, 2014, issued in corresponding U.S. Appl. No. 13/843,228, (10 pages).

Decision of a Patent Grant dated Jan. 6, 2015, issued in corresponding Japanese Application No. 2010-196950. w/ partial English Translation (2 pages).

* cited by examiner

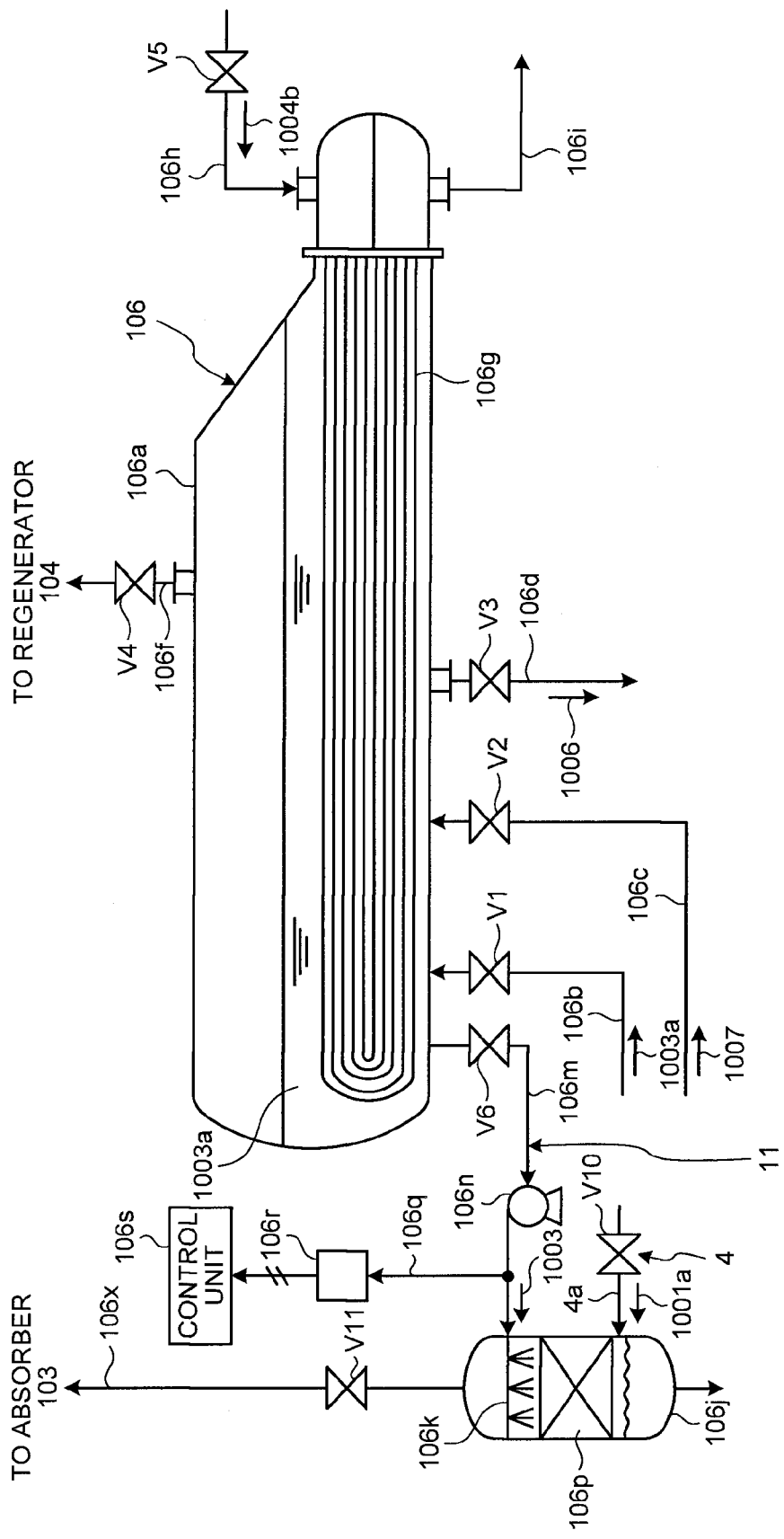

FIG.12

| | | |
|---|---|---|
| CONVENTIONAL EXAMPLE | ABSORBENT COMPONENT INCLUDED IN SLUDGE DISCHARGED IN ACCORDANCE WITH RECLAIMING | 7.3 [wt%] |
| | AMOUNT OF DISCHARGED SLUDGE FOR USING RECLAIMING ONCE | 19 [Ton]/ONE TIME |
| | NUMBER OF TIMES OF PERFORMING RECLAIMING FOR ONE YEAR | 3.8 TIMES/YEAR |
| | AMOUNT OF LOSS OF ABSORBENT FOR ONE YEAR BASED ON ABSORBENT COMPONENT INCLUDED IN SLUDGE | 5,993 [Kg]/YEAR |
| | RATIO OF AMOUNT OF LOSS OF ABSORBENT COMPONENT INCLUDED IN SLUDGE TO WHOLE ABSORBENT | 14.8 [%] |
| EXAMPLE | ABSORBENT COMPONENT INCLUDED IN SLUDGE | 1.0 [%] |
| | AMOUNT OF LOSS OF ABSORBENT FOR ONE YEAR BASED ON ABSORBENT COMPONENT INCLUDED IN SLUDGE | 820 [Kg]/YEAR |
| | AMOUNT OF DECREASE IN LOSS OF ABSORBENT FOR ONE YEAR | 5,173 [Kg]/YEAR |
| | ANNUAL REDUCTION RATIO OF ABSORBENT | 12.7 [%] |

RECLAIMING APPARATUS AND RECLAIMING METHOD

FIELD

The present invention relates to a reclaiming apparatus and a reclaiming method for eliminating a degraded material contained in an absorbent that absorbs $CO_2$ or $H_2S$ included in a gas.

BACKGROUND

In recent years, as a source that causes global warming, a greenhouse effect that is caused by $CO_2$ was pointed out, and a countermeasure thereof has been an international urgent task for keeping the global environment. Sources of the generation of $CO_2$ reach all the fields of human activities that incinerate fossil fuels, and the request for suppressing the discharge of $CO_2$ tends to be stronger. In accordance with this, a method of eliminating and recovering $CO_2$ contained in exhaust gas by bringing the exhaust gas of a boiler into contact with an amine-based $CO_2$ absorbent such as an alkanolamine aqueous solution and a method of storing recovered $CO_2$ without discharging it into the air for power generating facilities such as thermal power plants using a large amount of fossil fuels have been aggressively researched.

Conventionally, in Patent Literature 1, a method of eliminating $CO_2$ (carbon dioxide) and SOx (sulfur oxide) that are included in the exhaust gas is disclosed. This method includes: a denitration process in which NOx (nitrogen oxide) contained in the exhaust gas is reduced so as to be denitrated; a desulfurization process in which SOx contained in the exhaust gas is desulfurized by being brought into contact with calcium carbonate included in sludge; a de-$CO_2$ process in which $CO_2$ included in the exhaust gas is absorbed into an absorbent by bringing the exhaust gas for which the denitration process and the desulfurization process have been performed into concurrent contact with an amine-based absorbent (alkanolamine aqueous solution) at an absorber; and an absorbent regenerating process in which a lean solution acquired by eliminating $CO_2$ from a rich solution that has absorbed $CO_2$ at a regenerator is returned to the absorber. In this method, in order to prevent a situation in which a heat-stable salt generated by oxidizing alkanolamine with oxygen included in the exhaust so as to be degraded or reacting alkanolamine with remaining NOx or remaining SOx and a degraded material including a solid matter such as a dust included in the exhaust gas are accumulated within a system through which the absorbent passes, reclaiming is performed in which the absorbent is heated in a reclaimer, the degraded material is concentrated as sludge, and the degraded material is eliminated from the absorbent.

CITATION LIST

Patent Literature

Patent Literature 1: Japanese Laid-open Patent Publication No. 5-245339

SUMMARY

Technical Problem

In conventional reclaiming, by heating an absorbent that contains a degraded material, the degraded material is concentrated as sludge so as to be recovered, and the absorbent component becomes steam and is returned to the regenerator, whereby a situation can be prevented in which the degraded material is accumulated within the system through which the absorbent passes. However, in the reclaiming that depends only on a heating and evaporating operation, there is concern that a part of the absorbent component may not be evaporated but remains in the sludge. Accordingly, a loss of the absorbent is caused, and the absorbent corresponding to the amount of the loss needs to be supplemented. For example, there is concern that the absorbent component remaining in the sludge reaches about 5 [%] to 20 [%] of the whole absorbent. Since alkanolamine or the like that is an absorbent component is expensive, it is important to reduce the loss thereof for reducing the operating cost of the apparatus. Meanwhile, while the reclaiming operation is continued, the degraded material is concentrated, the boiling point rises, and the reclaiming is further continued, whereby it is necessary to increase the pressure of steam for the reclaiming.

The present invention solves the above-described problems, and an object thereof is to provide a reclaiming apparatus and a reclaiming method that are capable of reducing a loss of the absorbent by further separating the absorbent component and the degraded material from each other.

Solution to Problem

According to an aspect of the present invention, a reclaiming apparatus include: an absorbent storing unit that stores a part of an absorbent that has absorbed $CO_2$ or $H_2S$ included in a gas; and a heating unit that heats the absorbent stored in the absorbent storing unit. A part of the absorbent stored in the absorbent storing unit is distributed, and a gaseous body is brought into counterflow contact with the distributed absorbent.

According to this reclaiming apparatus, since a gaseous body is brought into counterflow contact with a part of the absorbent stored in the absorbent storing unit, an absorbent component volatilizes and is separated from a degraded material, and the absorbent component can be extracted from the degraded material, whereby a loss of the absorbent can be reduced.

In addition, in a general reclaiming apparatus, an absorbent starts to be heated at about 120 [° C.], and the heating temperature is raised, for example, up to 150 [° C.] in accordance with the concentration frequency of a degraded material. Accordingly, steam having higher pressure is needed in the heating source of the heating unit. Furthermore, there is concern that the absorbent component of the absorbent may be degraded by the heat that is accompanied with an increase in the heating temperature. Against such a problem, according to the reclaiming apparatus of the present invention, since the absorbent component is separated from the degraded material by bringing the absorbent that is stored in the absorbent storing unit and the gaseous body into counterflow contact with each other, the degraded material is concentrated, the heating temperature for concentrating the degraded material is suppressed, and the pressure of the steam of the heating source of the heating unit can be suppressed. In addition, since the heating temperature is suppressed, the amount of the absorbent component that is degraded by heating can be decreased. Furthermore, since the degraded material can be concentrated with the heating temperature of the heating unit suppressed, the efficiency of the operation of concentrating the degraded material is improved, whereby the size of the reclaiming apparatus can be decreased.

Advantageously, the reclaiming apparatus further includes: an absorbent distributing unit that forms a circulation mechanism that extracts a part of the absorbent stored in the absorbent storing unit and returns the extracted part to the absorbent storing unit for distribution; a steam supplying unit that generates steam from the absorbent that is heated by the heating unit; and an absorbent component extracting unit that is disposed in the absorbent storing unit and brings the absorbent that is returned to the absorbent storing unit in counterflow contact with the steam of the steam supplying unit.

According to this reclaiming apparatus, by using the steam of the absorbent that is heated by the heating unit that concentrates the degraded material included in the absorbent, a process of concentrating the degraded material and a process of separating the absorbent component from the degraded material can be performed by using the same heating source, whereby the facility cost can be reduced. In addition, according to this reclaiming apparatus, the absorbent distributing unit and the steam supplying unit can use the configurations of the absorbent storing unit and the heating unit, whereby the facility cost can be reduced.

Advantageously, the reclaiming apparatus further includes: a dry steam supplying unit that supplies dry steam having a temperature higher than a temperature to which the absorbent is heated to the absorbent storing unit.

According to this reclaiming apparatus, since the high-temperature dry steam is brought into counterflow contact with a part of the absorbent that is stored in the airtight container, the absorbent component more easily volatilizes and is reliably separated from a degraded material, and accordingly, the absorbent component can be more easily extracted from the degraded material, whereby a loss of the absorbent can be reduced.

Advantageously, the reclaiming apparatus further includes: an absorbent distributing unit that extracts and distributes a part of the absorbent that is stored in the absorbent storing unit; a steam supplying unit that supplies steam generated outside the reclaiming apparatus; and an absorbent component extracting unit that brings the absorbent extracted by the absorbent distributing unit in counterflow contact with the steam of the steam supplying unit.

According to this reclaiming apparatus, by using steam that does not include an absorbent component, the efficiency of separating the absorbent component from the degraded material can be improved.

Advantageously, the reclaiming apparatus further includes: an absorbent distributing unit that extracts and distributes a part of the absorbent that is stored in the absorbent storing unit; a gas supplying unit that supplies the gas in which $CO_2$ or $H_2S$ is absorbed; and an absorbent component extracting unit that brings the absorbent extracted by the absorbent distributing unit in counterflow contact with the gas of the gas supplying unit.

According to this reclaiming apparatus, by using a gas, which is generated outside the reclaiming apparatus, in which $CO_2$ or $H_2S$ is absorbed, the absorbent component can be separated from a degraded material.

Advantageously, the reclaiming apparatus further includes a packed bed that brings the absorbent and the steam in gas-liquid contact with each other.

According to this reclaiming apparatus, the separation of the absorbent component from a degraded material included in the absorbent can be promoted.

Advantageously, the reclaiming apparatus further includes: a pump that extracts and raises a part of the absorbent from the absorbent storing unit; and a nozzle that causes the absorbent pumped up by the pump to flow down against the steam that rises.

According to this reclaiming apparatus, the absorbent stored in the absorbent storing unit and the steam can be appropriately brought into counterflow contact with each other.

According to another aspect of the present invention, a reclaiming method includes: storing a part of an absorbent that absorbs $CO_2$ or $H_2S$ included in a gas; heating the stored absorbent; and bringing a part of the stored absorbent into counterflow contact with a gaseous body while the part is distributed.

According to this reclaiming method, since a gaseous body is brought into counterflow contact with a part of the absorbent stored in the absorbent storing unit, an absorbent component volatilizes and is separated from a degraded material, and the absorbent component can be extracted from the degraded material, whereby a loss of the absorbent can be reduced.

In addition, in a general reclaiming method, an absorbent starts to be heated at about 120 [° C.], and the heating temperature is raised, for example, up to 150 [° C.] in accordance with the concentration frequency of a degraded material. Accordingly, steam having higher pressure is needed in the heating source. Furthermore, there is concern that the absorbent component of the absorbent may be degraded by the heat that is accompanied with an increase in the heating temperature. Against such a problem, according to the reclaiming method of the present invention, since the absorbent component is separated from the degraded material by bringing the absorbent that is stored in the absorbent storing unit and the gaseous body into counterflow contact with each other, the degraded material is concentrated, the heating temperature for concentrating the degraded material is suppressed, and the pressure of the steam of the heating source can be suppressed. In addition, since the heating temperature is suppressed, the amount of the absorbent component that is degraded by heating can be decreased. Furthermore, since the degraded material can be concentrated with the heating temperature suppressed, the efficiency of the operation of concentrating the degraded material is improved, whereby the size of the reclaiming apparatus can be decreased.

Advantageously, the reclaiming method further includes: distributing the absorbent by circulating a part of the stored adsorbent solution; and bringing steam of the heated absorbent and the circulated absorbent into counterflow contact with each other.

According to this reclaiming method, by using the steam of the absorbent that is heated for concentrating the degraded material included in the absorbent, a process of concentrating the degraded material and a process of separating the absorbent component from the degraded material can be performed by using the same heating source, whereby the facility cost can be reduced.

Advantageously, the reclaiming method further includes bringing the absorbent, of which a part is circulated, in counterflow contact with dry steam having a temperature higher than a temperature to which the absorbent is heated.

According to this reclaiming method, since the dry steam is brought into counterflow contact with a part of the absorbent, the absorbent component more easily volatilizes and is reliably separated from a degraded material, and accordingly, the absorbent component can be more easily extracted from the degraded material, whereby a loss of the absorbent can be reduced.

Advantageously, the reclaiming method further includes: extracting and distributing a part of the stored absorbent; and bringing steam that is externally generated into counterflow contact with the extracted absorbent.

According to this reclaiming method, by using steam that does not include an absorbent component, the efficiency of separating the absorbent component from the degraded material can be improved.

Advantageously, the reclaiming method further includes: extracting and distributing a part of the stored absorbent; and bringing the gas in which $CO_2$ or $H_2S$ is absorbed in counterflow contact with the extracted absorbent.

According to this reclaiming method, by using a gas, which is generated outside the reclaiming apparatus, in which $CO_2$ or $H_2S$ is absorbed, the absorbent component can be separated from a degraded material.

Advantageously, the reclaiming method further includes: measuring an amount of an absorbent component included in the absorbent by sampling the stored absorbent; and ending the processes in a case where the measured amount of the absorbent component arrives at a predetermined amount or less.

According to this reclaiming method, the reclaiming is ended based on the amount of the absorbent component included in the absorbent that is stored, whereby the absorption function according to the absorbent can be constantly maintained in a stable state.

Advantageously, in the reclaiming method, the heating of the stored absorbent includes maintaining a pressure of steam at a predetermined pressure by performing heat exchange between the absorbent and the steam in a non-contact manner.

According to this reclaiming method, by maintaining the pressure of the steam used for heating the stored absorbent at predetermined pressure, the pressure of the steam of the heating source can be maintained to be constant, and accordingly, the amount of the absorbent component that is degraded by heating decreases, and a decrease in the size of the reclaiming apparatus can be realized.

Advantageously, in the reclaiming method, the pressure of the steam is maintained at 2 to 3 $[kg/cm^2 G]$.

By maintaining the pressure of the steam at 2 to 3 $[kg/cm^2 G]$, the amount of the absorbent component that is degraded by heating decreases, and a remarkable advantage of realizing a decrease in the size of the reclaiming apparatus can be acquired.

Advantageous Effects of Invention

According to the present invention, the absorbent component and the degraded material are further separated from each other, whereby a loss of the absorbent can be reduced.

BRIEF DESCRIPTION OF DRAWINGS

FIG. 11 is a schematic diagram of a reclaiming apparatus according to a fourth embodiment of the present invention.

FIG. 12 is a table that represents an experiment result of reclaiming according to an embodiment of the present invention.

DESCRIPTION OF EMBODIMENTS

Hereinafter, embodiments of the present invention will be described in detail with reference to the drawings. However, the present invention is not limited to the embodiments. In addition, each constituent element of the following embodiments includes an element with which the constituent element can be replaced by those skilled in the art or an element that is substantially the same as the constituent element.

First Embodiment

Figure 1:
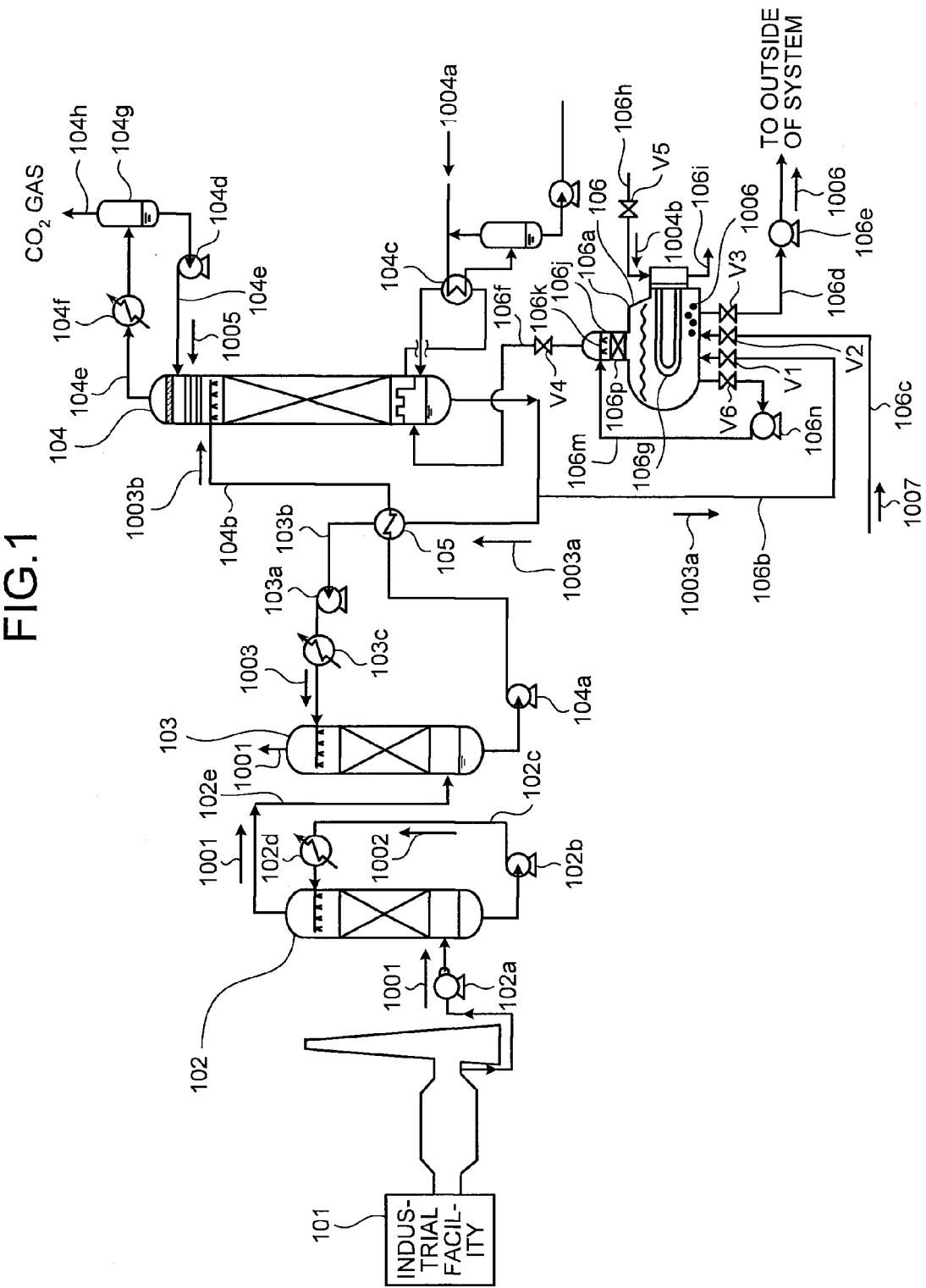
FIG. 1 is a schematic diagram of a recovery apparatus to which a reclaiming apparatus according to a first embodiment of the present invention is applied.

In a coal gasification gas, a synthesis gas, a coke-oven gas, a petroleum gas, a natural gas, and the like, $CO_2$ (carbon dioxide) or $H_2S$ (hydrogen sulfide) is included. A recovery apparatus that recovers $CO_2$ (carbon dioxide) and $H_2S$ (hydrogen sulfide) or a recovery apparatus that recovers $CO_2$ (carbon dioxide) from a combustion exhaust gas (hereinafter, referred to as an exhaust gas), as illustrated in FIG. 1, for example, includes: a cooling tower 102 that cools an exhaust gas 1001 that is discharged from an industrial facility 101 such as a boiler using cooling water 1002; an absorber 103 that discharges the exhaust gas 1001 from which $CO_2$ is eliminated by absorbing $CO_2$ included in the exhaust gas 1001 into an absorbent 1003 by bringing the absorbent 1003 (lean solution 1003a) that is an amine-based absorbent such as an alkanolamine solution that absorbs $CO_2$ into counterflow contact with the exhaust gas 1001; and a regenerator 104 that regenerates the absorbent 1003 (rich solution 1003b) that has absorbed $CO_2$.

In the cooling tower 102, after being pressurized by an exhaust gas blower 102a, the exhaust gas 1001 containing $CO_2$ is sent to the inside of the cooling tower 102 and is cooled by being brought into counterflow contact with the cooling water 1002 (exhaust gas cooling process). The cooling water 1002 is collected in a lower part of the inside of the cooling tower 102 and is supplied to an upper part of the inside of the cooling tower 102 through an external cooling water pipe 102c of the cooling tower 102 by a humidification cooling water circulating pump 102b. Then, the cooling water 1002 is brought into counterflow contact with the exhaust gas 1001 in the process of reaching the lower part of the inside of the cooling tower 102. In addition, in the cooling water pipe 102c, a cooler 102d that cools the cooling water 1002 is disposed.

The cooled exhaust gas 1001 is discharged from the cooling tower 102 through an exhaust gas pipe 102e and is supplied to the absorber 103.

In the absorber 103, the exhaust gas 1001 is brought into counterflow contact with the absorbent 1003 (lean solution 1003a) that has alkanolamine as its base, so that $CO_2$ included in the exhaust gas 1001 is absorbed into the absorbent 1003. Accordingly, $CO_2$ is eliminated from the exhaust gas 1001 (de-$CO_2$ process). The exhaust gas 1001 from which $CO_2$ is eliminated is discharged from the absorber 103. The absorbent 1003 (lean solution 1003a) is pumped from the regenerator 104 by an absorbent supplying pump 103a and is supplied to the upper part of the inside of the absorber 103 from the outside of the absorber 103 through a lean solution pipe 103b. Then, the absorbent 1003 is brought into counterflow contact with the exhaust gas 1001 in the process of reaching the lower part of the inside of the absorber 103. In the lean solution pipe 103b, a cooler 103c that cools the absorbent 1003 that is supplied to the absorber 103 is disposed. The absorbent 1003 (rich solution 1003b) that has absorbed $CO_2$ is collected in the lower part of the inside of the absorber 103, is discharged to the outside of the absorber 103 through an rich solution pipe 104b, and is supplied to the upper part of the inside of the regenerator 104 while being pumped by an absorbent discharging pump 104a.

In the regenerator 104, the rich solution 1003b of the absorbent 1003 is formed as a semi-lean solution by discharging most of $CO_2$ through an endothermic reaction, and the semi-lean solution is formed as a lean solution 1003a by eliminating almost all the $CO_2$ when reaching the lower part of the inside of the regenerator 104.

In the lower part of the regenerator 104, the lean solution 1003a is heated and regenerated by a regenerating heater 104c and saturated steam 1004a. Then, the regenerated lean solution 1003a is discharged to the outside of the regenerator 104 through the lean solution pipe 103b and, in the process of being supplied to the absorber 103, is cooled by a rich-lean heat exchanger 105 by exchanging heat with the rich solution 1003b that is in the process of being supplied to the regenerator 104 through the rich solution pipe 104b (absorbent regenerating process).

On the other hand, in the upper part of the regenerator 104, the $CO_2$ gas that has been separated from the rich solution 1003b and the semi-lean solution is discharged from the apex of the regenerator 104 to the outside of the regenerator 104 through a circulating current pipe 104e while being brought into contact with circulating water 1005 that is pumped from the outside of the regenerator 104 by a circulating water pump 104d. In the process of passing through the circulating current pipe 104e, after the $CO_2$ gas is cooled by a regenerator circulating current cooler 104f, steam is condensed by a $CO_2$ separator 104g, is separated from the circulating water 1005, and is led to a $CO_2$ recovery process through a recovered $CO_2$ discharging pipe 104h. The circulating water 1005 that has been separated from the $CO_2$ by the $CO_2$ separator 104g is pumped by the circulating water pump 104d and is supplied to the regenerator 104 through the circulating current pipe 104e.

Although not illustrated in the diagram, between the industrial facility 101 and the cooling tower 102 of the recovery apparatus, a denitration apparatus that performs a denitration process by reducing and denitrating NOx (nitrogen oxide) included in the exhaust gas 1001 and a desulfurization apparatus that performs a desulfurization process in which SOx (sulfur oxide) included in the exhaust gas 1001 is desulfurized by being brought into contact with calcium carbonate included in sludge are disposed.

In the above-described recovery apparatus, when $CO_2$ included in the exhaust gas 1001 is recovered, alkanolamine is degraded due to oxygen so as to generate a heat-stable salt. In addition, remaining NOx that has not been eliminated by the denitration process, remaining SOx that has not been eliminated from the desulfurization process, or the like reacts with alkanolamine included in the $CO_2$ absorbent 1003 so as to generate a heat-stable salt in the de-$CO_2$ process. The heat-stable salt is included in the absorbent 1003 as a degraded material together with a solid matter such as a dust included in the exhaust gas 1001 and is not eliminated under a normal condition in an absorbent regenerating process in which the lean solution 1003a is regenerated from the rich solution 1003b. As a result, as the absorbent 1003 including the degraded material circulates within the system of the recovery apparatus, the degraded material is slowly accumulated within the system. Accordingly, the recovery apparatus includes a reclaiming apparatus 106 that reclaims the degraded material that remains in the lean solution 1003a generated in the regenerator 104 as heated and concentrated sludge (concentrated waste) 1006.

The reclaiming apparatus 106 extracts the lean solution 1003a from the lean solution pipe 103b that is disposed before the rich-lean heat exchanger 105 from the regenerator 104, stores the lean solution 1003a, heats the lean solution 1003a, for example, to 120 [° C.] to 150 [° C.], returns the absorbent 1003 that is evaporated from the lean solution 1003a to the lower part of the regenerator 104, and discharges the sludge 1006 that is concentrated by heating.

Figure 2:
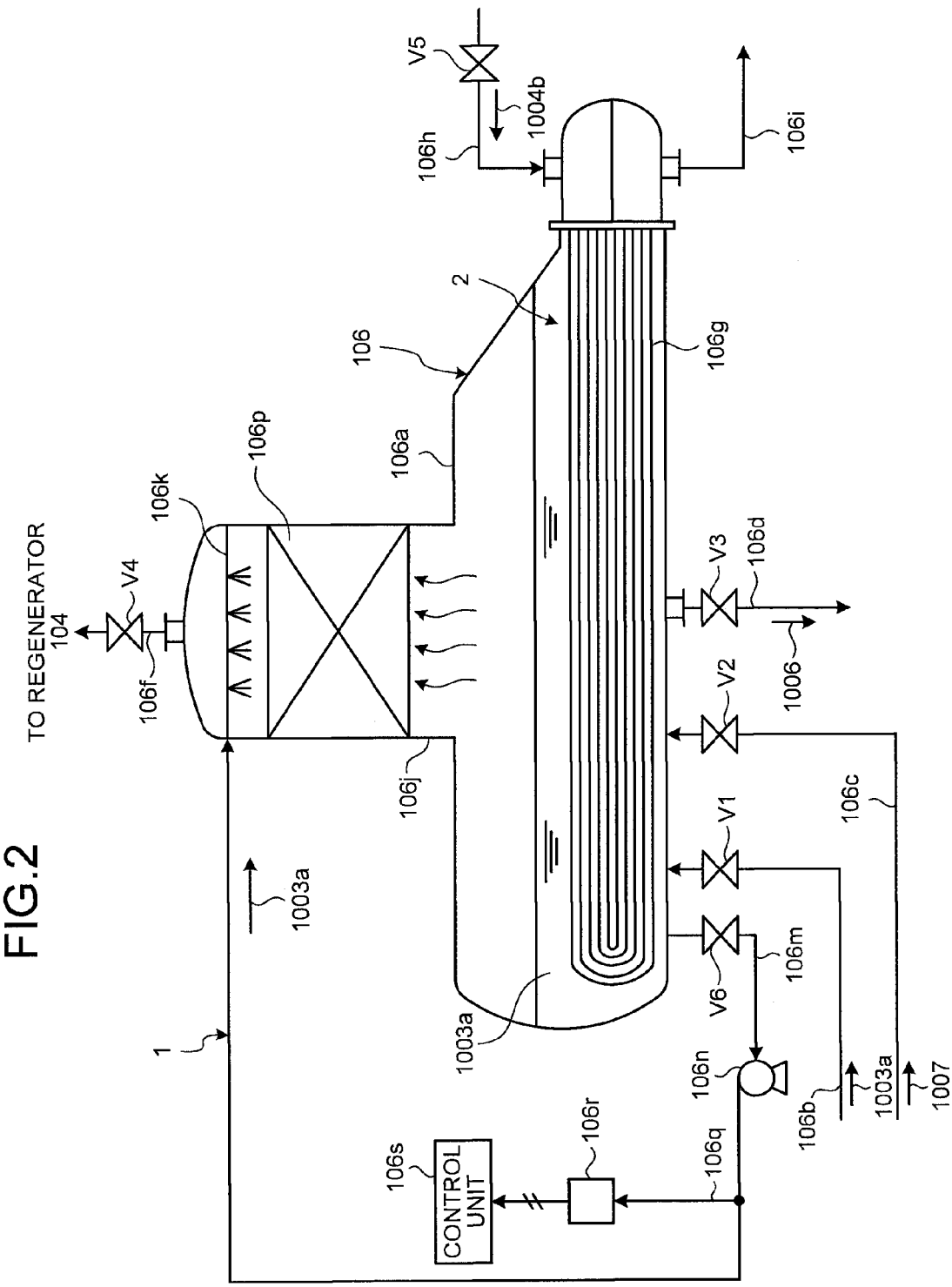
FIG. 2 is a schematic diagram of a reclaiming apparatus according to the first embodiment of the present invention.

The reclaiming apparatus 106 mainly includes an absorbent storing unit and a heating unit. As illustrated in FIGS. 1 and 2, the absorbent storing unit is configured as an airtight container 106a that extracts a part of the absorbent 1003 that has recovered $CO_2$ from the exhaust gas 1001 and stores the extracted part of the absorbent. The airtight container 106a is connected to a position of the lean solution pipe 103b that is disposed before reaching the rich-lean heat exchanger 105 from the regenerator 104 through a discharge pipe 106b. An open-close valve V1 is disposed in the discharge pipe 106b. In addition, a water supplying pipe 106c that sends dilution water 1007 is connected to the airtight container 106a. An open-close valve V2 is disposed in the water supplying pipe 106c. Furthermore, a sludge discharging pipe 106d that discharges the sludge 1006 is connected to the airtight container 106a. An open-close valve V3 and a sludge discharging pump 106e are disposed in the sludge discharging pipe 106d. In addition, an absorbent discharging pipe 106f connected to the lower part of the regenerator 104 is connected to the upper part of the airtight container 106a. An open-close valve V4 is disposed in the absorbent discharging pipe 106f.

The heating unit is disposed inside the airtight container 106a and is configured by: a steam pipe 106g having a "U" shape that is horizontally arranged; a steam supplying pipe 106h that is connected to one end of each steam pipe 106g and supplies saturated steam 1004b that is generated by heating using a heating source, which is not illustrated in the diagram, outside the airtight container 106a; and a steam discharging pipe 106i that is connected to the other end of the each steam pipe 106g and discharges the saturated steam 1004b to the outside of the airtight container 106a. In addition, an open-close valve V5 is disposed in the steam supplying pipe 106h.

The reclaiming apparatus 106 supplies the lean solution 1003a to the inside of the airtight container 106a by opening the open-close valve V1, supplies the dilution water 1007 to the inside of the airtight container 106a by opening the open-close valve V2, and let the saturated steam 1004b through the steam pipe 106g by opening the open-close valve V5, whereby the lean solution 1003a and the dilution water 1007 that have been supplied are heated, for example, through non-contact heat exchange at 120 to 150° C. Then, a degraded material that is included in the lean solution 1003a is concentrated as sludge 1006 at the bottom of the airtight container 106a. The sludge 1006 is discharged to the outside of the airtight container 106a and is recovered outside the system of the recovery apparatus by opening the open-close valve V3 and operating the sludge discharging pump 106e. The recovered sludge 1006 is incinerated. On the other hand, the lean solution 1003a and the dilution water 1007 are evaporated by being heated. The evaporated lean solution 1003a passes through the open open-close valve V4 and is returned to the regenerator 104 through the absorbent discharging pipe 106f. In this way, the degraded material included in the lean solution 1003a is separated, and a situation can be prevented in which the degraded material is accumulated within the system of the recovery apparatus.

However, in the reclaiming that depends only on heating, there is concern that a part of the absorbent component does not evaporate and remains in the sludge. Accordingly, there is concern that there is a loss of the absorbent.

Accordingly, the reclaiming apparatus 106 of this embodiment, as illustrated in FIGS. 1 and 2, includes an absorbent component extracting unit 106j, a nozzle 106k, an absorbent discharging pipe 106m, an open-close valve V6, a discharge pump 106n, and a packed bed 106p.

The absorbent component extracting unit 106j is disposed on the upper side of the airtight container 106a. The apex of the absorbent component extracting unit 106j is closed while a lower part thereof communicates with the airtight container 106a and is formed so as to swell to the upper side from the upper part of the airtight container 106a for forming a part of the airtight container 106a. The absorbent discharging pipe 106f is connected to the apex of the absorbent component extracting unit 106j. A nozzle 106k is disposed in an upper part inside the absorbent component extracting unit 106j. This nozzle 106k is connected to the bottom of the airtight container 106a through the absorbent discharging pipe 106m. In the absorbent discharging pipe 106m, the open-close valve V6 and the discharge pump 106n are disposed. In addition, the packed bed 106p is disposed on the lower side of the nozzle 106k inside the absorbent component extracting unit 106j.

As the reclaiming apparatus 106 opens the open-close valve V6 and operates the discharge pump 106n, a part of the lean solution 1003a containing a degraded material is supplied to the nozzle 106k from the airtight container 106a through the absorbent discharging pipe 106m and is injected into the inside of the absorbent component extracting unit 106j from the nozzle 106k and flows to the lower side. In other words, an absorbent distributing unit 1 forming a circulation mechanism is configured by the absorbent discharging pipe 106m, the open-close valve V6, the discharge pump 106n, and the nozzle 106k, which returns a part of the $CO_2$ absorbent 1003 stored in the airtight container 106a that is an absorbent storing unit to the airtight container 106a through the absorbent component extracting unit 106j while extracting the part of the $CO_2$ absorbent.

Meanwhile, when the lean solution 1003a is heated by letting the saturated steam 1004b through the steam pipe 106g by opening the open-close valve V5, the lean solution 1003a that is stored inside the airtight container 106a becomes steam and rises so as to reach the absorbent component extracting unit 106j. Then, the steam of the lean solution 1003a that has risen is brought into counterflow contact with the lean solution 1003a that has flown down from the nozzle 106k at the position of the packed bed 106p. In other words, a steam supplying unit 2 is configured by the airtight container 106a, the steam pipe 106g, the steam supplying pipe 106h, the steam discharging pipe 106i, and the open-close valve V5, which supplies steam so as to oppose a distribution direction of the absorbent 1003 according to the absorbent distributing unit 1 inside the absorbent component extracting unit 106j.

Figure 3:
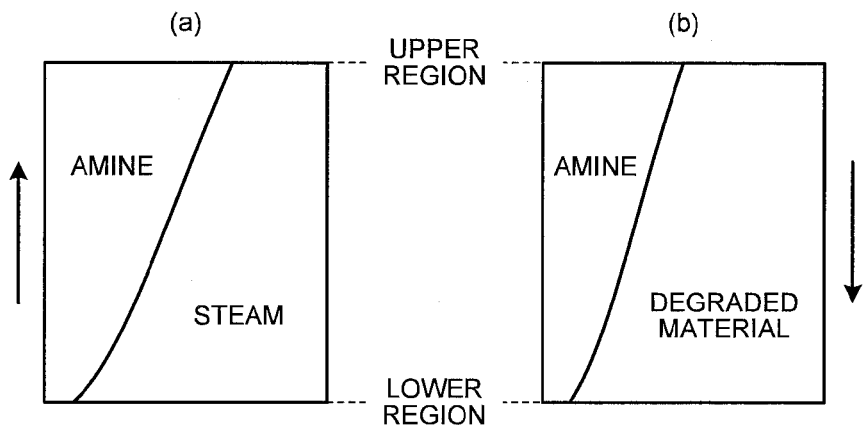
FIG. 3 is an explanatory diagram of the operation of the reclaiming apparatus according to the first embodiment of the present invention.

Then, the lean solution 1003a that flows down from the nozzle 106k is brought into counterflow contact with the steam of the lean solution 1003a that rises from the airtight container 106a, whereby the absorbent component volatilizes. In other words, as illustrated in FIG. 3(a), the rising steam arrives at an upper region from a lower region and is brought into counterflow contact with the absorbent 1003 (lean solution 1003a), whereby the absorbent component (amine) included in the gas phase is allowed to volatilize from the absorbent 1003 (lean solution 1003a) so as to be extracted. On the other hand, as illustrated in FIG. 3(b), the absorbent 1003 (lean solution 1003a) flowing down arrives at the lower region from the upper region and is brought into counterflow contact with the steam, whereby an absorbent component (amine) included in the liquid phase volatilizes and is separated from the degraded material. In this way, the absorbent component that has volatilized is separated from the degraded material, passes through the open open-close valve V4, and is returned to the regenerator 104 through the absorbent discharging pipe 106f.

In addition, the packed bed 106p is preferable for allowing the absorbent component to volatilize and is separated from the degraded material by bringing the lean solution 1003a that flows down from the nozzle 106k and the steam of the lean solution 1003a that rises from the airtight container 106a inside the absorbent component extracting unit 106j into gas-liquid contact with each other. The packed bed 106p has a packed bed structure in which fillers such as ball rings or cascade rings are filled or the like. Although the packed bed 106p is preferably included, the absorbent component can be separated from the degraded material by bringing the lean solution 1003a that flows down from the nozzle 106k and the steam of the lean solution 1003a rising from the airtight container 106a inside the absorbent component extracting unit 106j into counterflow contact with each other even without including the packed bed 106p.

In addition, the reclaiming apparatus 106 according to this embodiment includes a recovery unit 106q that recovers (samples) a part of the absorbent 1003 (lean solution 1003a) that is stored in the airtight container 106a. The recovery unit 106q is connected to the absorbent discharging pipe 106m at the latter part of the discharge pump 106n. In the recovery unit 106q, a measurement unit 106r that measures the amount of an absorbent component included in the recovered absorbent 1003 (lean solution 1003a) is disposed. Measurement information that is measured by the measurement unit 106r is output to an control unit 106s. The sampling of the absorbent 1003 (lean solution 1003a) is not limited to be performed using the absorbent discharging pipe 106m, but the absorbent 1003 may be recovered from the airtight container 106a.

Figure 4:
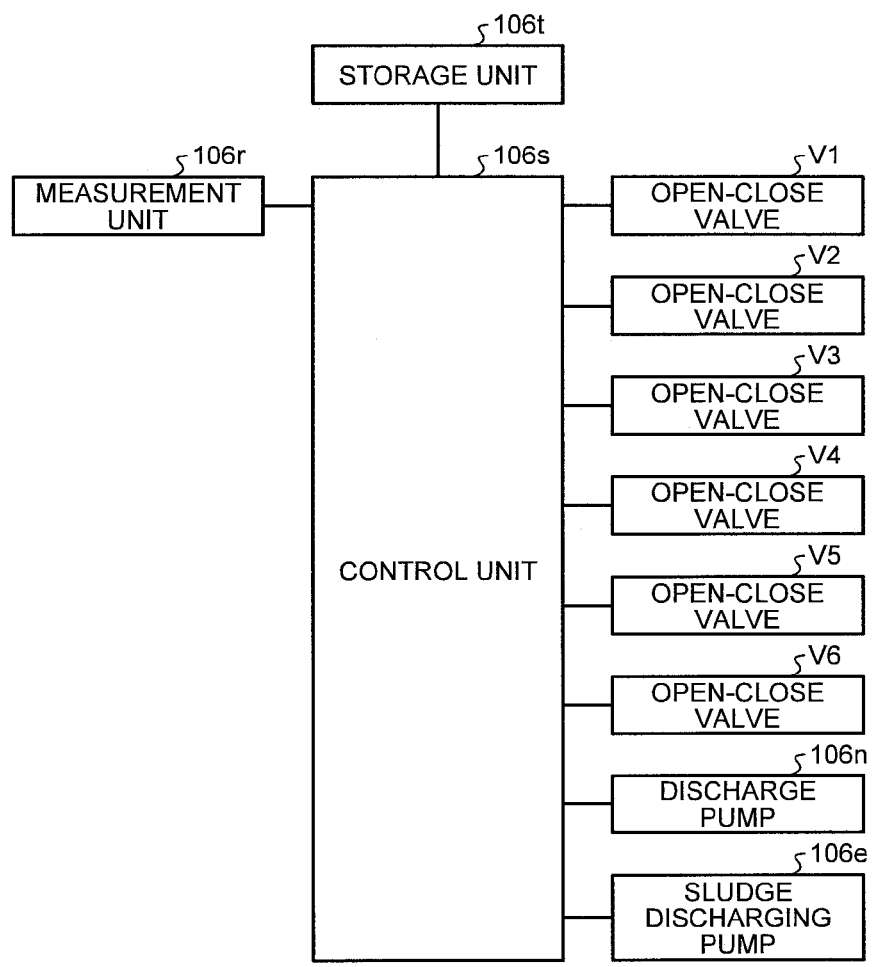
FIG. 4 is a block diagram of a control system of the reclaiming apparatus according to the first embodiment of the present invention.

The control unit 106s is configured by a microcomputer or the like. As illustrated in FIG. 4, a storage unit 106t is disposed in the control unit 106s. The storage unit 106t is configured by a RAM, a ROM, and the like, and a program and data are stored therein. In the storage unit 106t, data of the amount of the absorbent component that is included in the absorbent 1003 (lean solution 1003a) stored in the airtight container 106a is stored for operating the reclaiming apparatus. In the data, for example, the amount of the absorbent component included in the absorbent 1003 (lean solution 1003*a*) is set to 5 [wt %]. This setting is an index that represents the amount of decrease in the absorbent component from the absorbent 1003 (lean solution 1003*a*) that is stored in the airtight container 106*a* and may be arbitrarily set. The measurement unit 106*r*, the open-close valves V1 to V6, and the pumps 106*e* and 106*n* are connected to the control unit 106*s*. The control unit 106*s* controls the overall operation of the open-close valves V1 to V6 and the pumps 106*e* and 106*n* described above based on density information input from the measurement unit 106*r* in accordance with a program and data that are stored in the storage unit 106*t* in advance.

Figure 5:
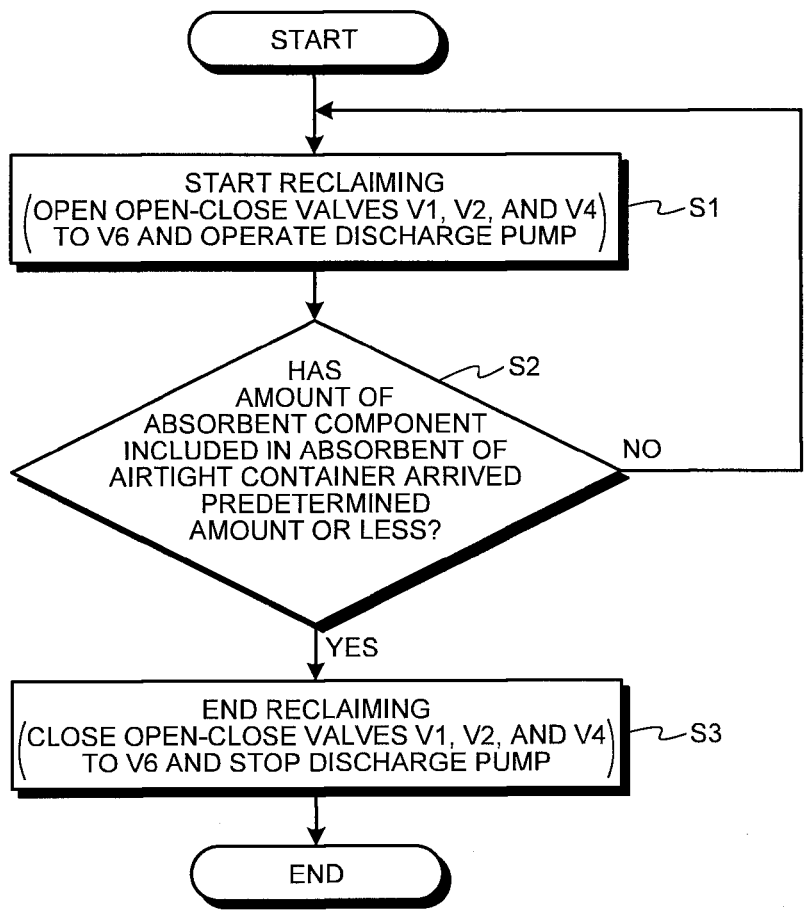
FIG. 5 is a flowchart of a control process of the reclaiming apparatus according to the first embodiment of the present invention.

The control unit 106*s*, as illustrated in FIG. 5, opens the open-close valves V1, V2, and V4 to V6 and operates the discharge pump 106*n* based on a reclaiming start instruction (Step S1). Accordingly, a part of the absorbent 1003 (lean solution 1003*a*) arrives at the airtight container 106*a* from the regenerator 104 and is stored, is heated together with the dilution water 1007 so as to be evaporated, and is returned to the regenerator 104 through the absorbent discharging pipe 106*f*. In addition, the absorbent 1003 (lean solution 1003*a*) stored in the airtight container 106*a* volatilizes by being brought into counterflow contact with the steam of the absorbent 1003 (lean solution 1003*a*) that rises from the airtight container 106*a* inside the absorbent component extracting unit 106*j* while flowing down from the nozzle 106*k* and is returned to the regenerator 104 through the absorbent discharging pipe 106*f*. As a result, the absorbent component can be separated and extracted from the degraded material. Then, the control unit 106*s* ends reclaiming by closing the open-close valves V1, V2, and V4 to V6 and stopping the discharge pump 106*n* in a case where the amount of the absorbent component included in the absorbent 1003 (lean solution 1003*a*) included in the airtight container 106*a* becomes a predetermined amount (for example, 5 [wt %]) or less (Yes in Step S2) based on the measurement information that is input from the measurement unit 106*r* (Step S3). Then, after the reclaiming ends, the sludge 1006 is discharged to the outside of the airtight container 106*a* by opening the open-close valve V3 and operating the sludge discharging pump 106*e*.

In this way, the reclaiming apparatus 106 according to the first embodiment described above includes the airtight container 106*a* that is an absorbent storing unit that stores a part of the absorbent 1003 that has absorbed $CO_2$ included in the exhaust gas 1001 and the heating unit that heats the absorbent 1003 that is stored in the airtight container 106*a*, distributes a part of the absorbent 1003 that is stored in the airtight container 106*a*, and brings the steam (gaseous body) into counterflow contact with the distributed absorbent 1003.

According to this reclaiming apparatus 106, since the steam is brought into counterflow contact with a part of the absorbent 1003 that is stored in the airtight container 106*a*, the absorbent component volatilizes and is separated from the degraded material, and accordingly, the absorbent component can be extracted from the degraded material, whereby a loss of the absorbent 1003 can be reduced.

In a general reclaiming apparatus, an absorbent 1003 starts to be heated at about 120 [° C.], and the heating temperature is raised, for example, up to 150 [° C.] in accordance with the concentration frequency of a degraded material. Accordingly, it is necessary to increase the pressure of steam passing through the steam pipe 106*g* that is a heating unit, and steam having higher pressure is needed in the heating source. In addition, there is concern that alkanolamine that is the absorbent component of the absorbent 1003 may be degraded by the heat that is accompanied with an increase in the heating temperature. Against such a problem, according to the reclaiming apparatus 106 of the first embodiment, since the absorbent component is separated from the degraded material by bringing the absorbent 1003 that is stored in the airtight container 106*a* and the steam into counterflow contact with each other, the degraded material is concentrated, the heating temperature for concentrating the degraded material is suppressed, and an increase in the pressure of the heating unit is suppressed, whereby the pressure of the steam of the heating source can be suppressed. In addition, since the heating temperature is suppressed, the amount of the absorbent component that is degraded by heating can be decreased. Furthermore, the degraded material can be concentrated with the heating temperature of the heating unit suppressed, and accordingly, the efficiency of the operation of concentrating the degraded material is improved, whereby the size of the reclaiming apparatus 106 can be decreased.

In addition, the reclaiming apparatus 106 of the first embodiment includes: the absorbent distributing unit 1 forming a circulation mechanism that extracts a part of the absorbent 1003 stored in the airtight container 106*a* and returns the extracted part to the airtight container 106*a* for circulation; the steam supplying unit 2 that generates steam from the absorbent 1003 heated by the heating unit; and the absorbent component extracting unit 106*j* that is disposed in the airtight container 106*a* and brings the absorbent 1003 returned to the airtight container 106*a* into counterflow contact with the steam of the steam supplying unit 2.

According to this reclaiming apparatus 106, by using the steam of the absorbent 1003 that is heated by the heating unit that concentrates the degraded material included in the absorbent 1003, a process of concentrating the degraded material and a process of separating the absorbent component from the degraded material can be performed by using the same heating source, whereby the facility cost can be reduced. In addition, according to this reclaiming apparatus 106, the absorbent distributing unit 1 and the steam supplying unit 2 can use the configurations of the airtight container 106*a* and the heating unit, whereby the facility cost can be reduced.

Furthermore, the reclaiming apparatus 106 according to the first embodiment further includes the packed bed 106*p* that brings the absorbent 1003 that is distributed by the absorbent distributing unit 1 and the steam into gas-liquid contact.

According to this reclaiming apparatus 106, it is possible to promote the separation of the absorbent component from the degraded material that is included in the absorbent 1003.

In addition, in the reclaiming apparatus 106 according to the first embodiment, the absorbent distributing unit 1 includes the discharge pump 106*n* that extracts a part of the absorbent 1003 from the airtight container 106*a* and pumps up the extracted part and the nozzle 106*k* that allows the absorbent 1003 that is pumped up by the discharge pump 106*n* to flow down against the steam that rises.

According to this reclaiming apparatus 106, a counterflow contact between the absorbent 1003 that is stored in the airtight container 106*a* and the steam can be appropriately performed.

In addition, the reclaiming apparatus 106 of the first embodiment further includes the measurement unit 106*r* that measures the amount of the absorbent component included in the absorbent 1003 that is stored in the airtight container 106*a* and the control unit 106*s* that ends the reclaiming when the amount of the absorbent component that is acquired from the measurement unit 106*r* arrives at a predetermined amount or less.

According to this reclaiming apparatus 106, the reclaiming is ended based on the amount of the absorbent component included in the absorbent 1003 that is stored in the airtight container 106a, whereby the absorption function according to the absorbent 1003 can be constantly maintained in a stable state.

In addition, in the reclaiming apparatus 106 described above, the open-close valves V1, V2, and V4 to V6 are opened, and the discharge pump 106n is operated when the reclaiming is started. Accordingly, the heating and evaporating of the absorbent 1003 (lean solution 1003a) and the volatilization of the absorbent component are performed at the same time, whereby the efficiency of the reclaiming operation can be improved.

Furthermore, in the reclaiming apparatus 106 described above, after the absorbent 1003 (lean solution 1003a) is heated and evaporated with the open-close valves V1, V2, V4, and V5 opened at the time of starting the reclaiming, the absorbent component may be volatilized by opening the open-close valve V6 and operating the discharge pump 106n. Accordingly, for example, an absorbent 1003 that contains 3 [wt %] of the absorbent component at the time of heating the absorbent 1003 (lean solution 1003a) is concentrated as an absorbent 1003 that contains 5 [wt %] of the absorbent component after the heating and evaporating is performed, the concentrated absorbent 1003 is brought into counterflow contact with the steam, and, accordingly, the amount of the absorbent component that volatilizes increases, whereby the separation efficiency of the absorbent component from the degraded material can be improved.

A reclaiming method according to the first embodiment includes a process of storing a part of an absorbent 1003 that has absorbed $CO_2$ included in an exhaust gas 1001 and a process of heating the stored absorbent 1003 and includes a process of bringing a part of the stored absorbent 1003 into counterflow contact with steam (gaseous body) while distributing it.

According to this reclaiming method, since the steam is brought into counterflow contact with a part of the stored absorbent 1003, an absorbent component volatilizes and is separated from a degraded material, and accordingly, the absorbent component can be extracted from the degraded material, whereby a loss of the absorbent 1003 can be reduced.

In a general reclaiming method, the absorbent 1003 starts to be heated at about 120 [° C.], and the heating temperature is raised, for example, up to 150 [° C.] in accordance with the concentration frequency of the degraded material. Accordingly, it is necessary to increase the pressure of steam passing through the steam pipe 106g that is a heating unit, and steam having higher pressure is needed in the heating source. In addition, there is concern that alkanolamine that is the absorbent component of the absorbent 1003 may be degraded by the heat that is accompanied with an increase in the heating temperature. Against such a problem, according to the reclaiming method of the first embodiment, since the absorbent component is separated from the degraded material by bringing the stored absorbent 1003 and the steam into counterflow contact with each other, the degraded material is concentrated, the heating temperature for concentrating the degraded material is suppressed, and an increase in the pressure of the heating unit is suppressed, whereby the pressure of the steam of the heating source can be suppressed. In addition, since the heating temperature is suppressed, the amount of the absorbent component that is degraded by heating can be decreased. Furthermore, the degraded material can be concentrated with the heating temperature of the heating unit suppressed, and accordingly, the efficiency of the operation of concentrating the degraded material is improved, whereby the size of the reclaiming apparatus can be decreased.

In addition, the reclaiming method according to the first embodiment includes a process of distributing the absorbent 1003 by circulating a part of the stored absorbent 1003 and a process of bringing the steam of the heated absorbent 1003 and the circulated absorbent 1003 into counterflow contact with each other.

According to the reclaiming method, by using the steam of the absorbent 1003 that is heated for concentrating the degraded material included in the absorbent 1003, a process of concentrating the degraded material and a process of separating the absorbent component from the degraded material can be performed by using the same heating source, whereby the facility cost can be reduced.

In addition, the reclaiming method of the first embodiment includes a process of sampling the stored absorbent 1003 and measuring the amount of the absorbent component included in the absorbent 1003 and a process of ending the reclaiming in a case where the measured amount of the absorbent component arrives at a predetermined amount or less.

According to the reclaiming method, by ending the reclaiming based on the amount of the absorbent component that is included in the sored absorbent 1003, the absorption function according to the absorbent 1003 can be constantly maintained in a stable state.

In addition, in the reclaiming method of the first embodiment, the process of heating the stored absorbent 1003 includes a process of performing heat exchange between the absorbent 1003 and steam in a non-contact manner and maintaining the pressure of the steam at predetermined pressure (for example, 2 to 3 [$kg/cm^2 G$]).

According to this reclaiming method, as described above, an increase in the pressure of the heating unit is suppressed, and accordingly, by maintaining the pressure of the steam used for heating the stored absorbent 1003 at predetermined pressure, the pressure of the steam of the heating source can be maintained to be constant, and accordingly, the amount of the absorbent component that is degraded by heating decreases, and a decrease in the size of the reclaiming apparatus can be realized.

Second Embodiment

A reclaiming apparatus according to a second embodiment is applied to a recovery apparatus that has the same main configuration as that of the above-described the first embodiment and is different from the reclaiming apparatus of the first embodiment in some of the configurations. Thus, in the second embodiment to be described below, description of the recovery apparatus will not be presented, the same reference numeral is assigned to a configuration of the reclaiming apparatus that is equivalent to that of the first embodiment, and description thereof will not be presented.

Figure 6:
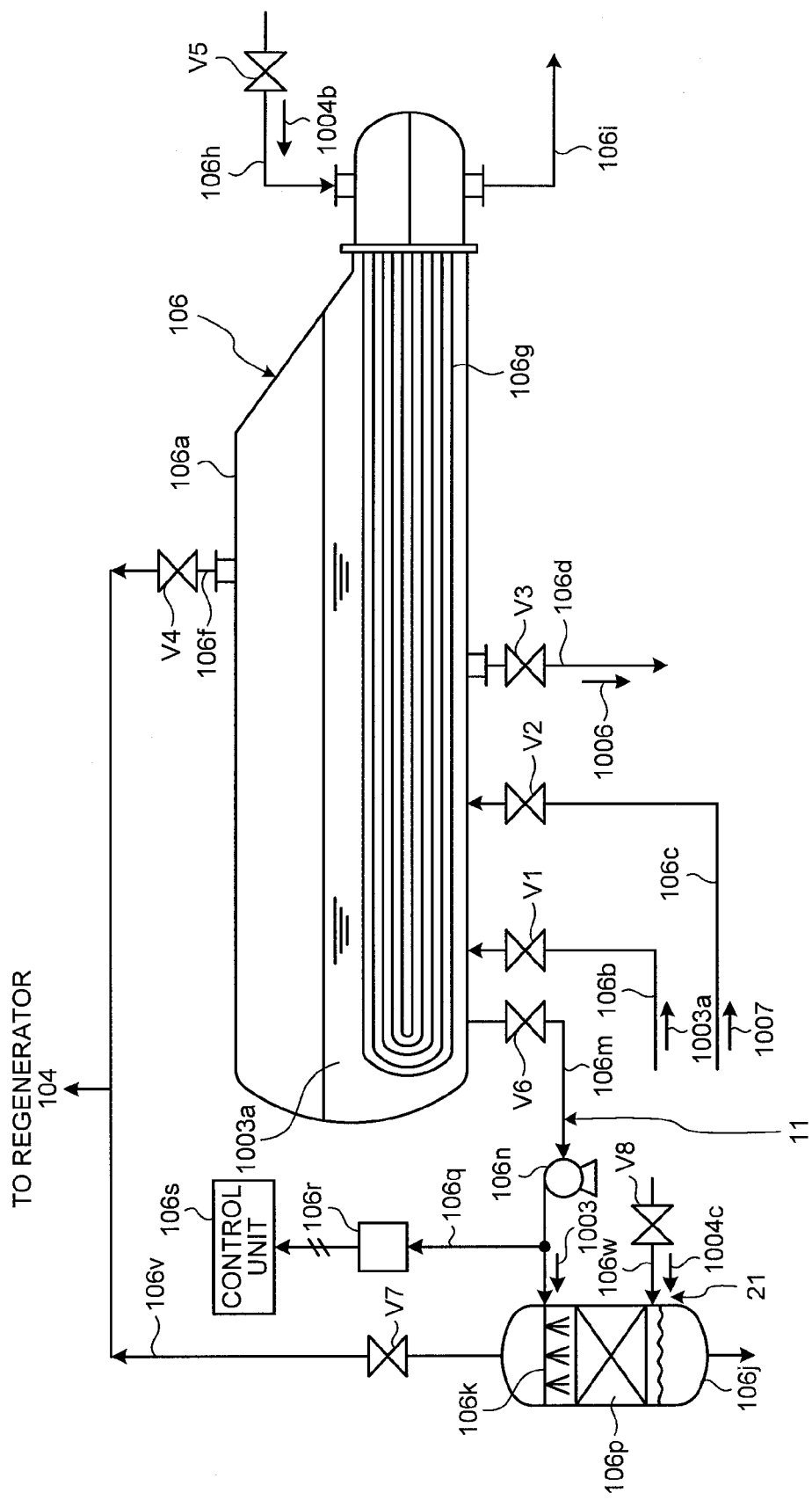
FIG. 6 is a schematic diagram of a reclaiming apparatus according to a second embodiment of the present invention.

The reclaiming apparatus 106 according to this embodiment, as illustrated in FIG. 6, includes an absorbent component extracting unit 106j, a nozzle 106k, an absorbent discharging pipe 106m, an open-close valve V6, a discharge pump 106n, a packed bed 106p, an absorbent discharging pipe 106v, an open-close valve V7, a steam introducing pipe 106w, and an open-close valve V8.

The absorbent component extracting unit 106j forms an airtight container that is disposed separately from the airtight container 106a. The absorbent discharging pipe 106v is connected to the convex of the absorbent component extracting unit 106j. The absorbent discharging pipe 106v is connected to the absorbent discharging pipe 106f described above and is connected to the lower side of the regenerator 104. The open-close valve V7 is disposed in the absorbent discharging pipe 106v.

The nozzle 106k is disposed in an upper part inside the absorbent component extracting unit 106j. The nozzle 106k is connected to the bottom of the airtight container 106a through the absorbent discharging pipe 106m. The open-close valve V6 and the discharge pump 106n are disposed in the absorbent discharging pipe 106m. The packed bed 106p is disposed on the lower side of the nozzle 106k inside the absorbent component extracting unit 106j. The steam introducing pipe 106w is connected to a lower part inside the absorbent component extracting unit 106j and introduces saturated steam 1004c into the inside of the absorbent component extracting unit 106j. The open-close valve V8 is disposed in the steam introducing pipe 106w.

As the reclaiming apparatus 106 opens the open-close valve V6 and operates the discharge pump 106n, a part of the lean solution 1003a containing a degraded material is supplied to the nozzle 106k from the airtight container 106a through the absorbent discharging pipe 106m and is injected into the inside of the absorbent component extracting unit 106j from the nozzle 106k and flows to the lower side. In other words, an absorbent distributing unit 11 is configured by the absorbent discharging pipe 106m, the open-close valve V6, the discharge pump 106n, and the nozzle 106k, which extracts a part of the $CO_2$ absorbent 1003 stored in the airtight container 106a that is an absorbent storing unit and distributes the extracted part to the absorbent component extracting unit 106j.

Meanwhile, by opening the open-close valve V8, the saturated steam 1004c is introduced to the lower side inside the absorbent component extracting unit 106j through the steam introducing pipe 106w. The saturated steam 1004c rises inside the absorbent component extracting unit 106j. Then, the saturated steam 1004c that has risen is brought into counterflow contact with a lean solution 1003a that flows down from the nozzle 106k at the position of the packed bed 106p. In other words, a steam supplying unit 21 is configured by the steam introducing pipe 106w and the open-close valve V8, which supplies steam so as to oppose the distribution direction of the absorbent 1003 according to the absorbent distributing unit 11 inside the absorbent component extracting unit 106j.

Figure 7:
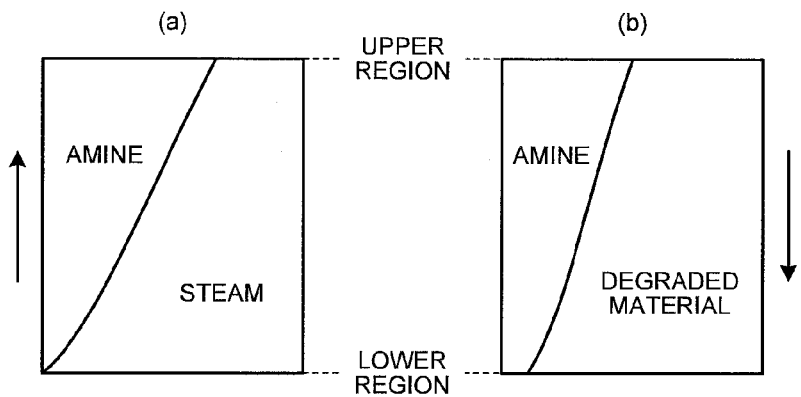
FIG. 7 is an explanatory diagram of the operation of the reclaiming apparatus according to the second embodiment of the present invention.

Then, the lean solution 1003a that flows down from the nozzle 106k is brought into counterflow contact with the saturated steam 1004c that rises inside the absorbent component extracting unit 106j, whereby the absorbent component volatilizes. In other words, as illustrated in FIG. 7(a), the rising steam arrives at an upper region from a lower region and is brought into counterflow contact with the absorbent 1003 (lean solution 1003a), thereby allowing the absorbent component (amine) included in the gas phase to volatilize from the absorbent 1003 (lean solution 1003a) so as to be extracted. On the other hand, as illustrated in FIG. 7(b), the absorbent 1003 (lean solution 1003a) flowing down arrives at the lower region from the upper region and is brought into counterflow contact with the saturated steam 1004c, whereby an absorbent component (amine) included in the liquid phase volatilizes and is separated from the degraded material.

In this way, the absorbent component that has volatilized is separated from the degraded material, passes through the open open-close valve V7, and is returned to the regenerator 104 through the absorbent discharging pipe 106v.

In addition, the packed bed 106p is preferable for allowing the absorbent component to volatilize and is separated from the degraded material by bringing the lean solution 1003a that flows down from the nozzle 106k and the rising saturated steam 1004c into gas-liquid contact with each other. The packed bed 106p has a packed bed structure in which fillers such as ball rings or cascade rings are filled or the like. Although the packed bed 106p is preferably included, the absorbent component can be separated from the degraded material by bringing the lean solution 1003a that flows down from the nozzle 106k and the rising saturated steam 1004c into counterflow contact with each other even without including the packed bed 106p.

In addition, the reclaiming apparatus 106 according to this embodiment includes a recovery unit 106q that recovers (samples) a part of the absorbent 1003 (lean solution 1003a) that is stored in the airtight container 106a. The recovery unit 106q is connected to the absorbent discharging pipe 106m at the latter part of the discharge pump 106n. In the recovery unit 106q, a measurement unit 106r that measures the amount of an absorbent component included in the recovered absorbent 1003 (lean solution 1003a) is disposed. Measurement information that is measured by the measurement unit 106r is output to the control unit 106s. The sampling of the absorbent 1003 (lean solution 1003a) is not limited to be performed using the absorbent discharging pipe 106m, but the absorbent 1003 may be recovered from the airtight container 106a.

Figure 8:
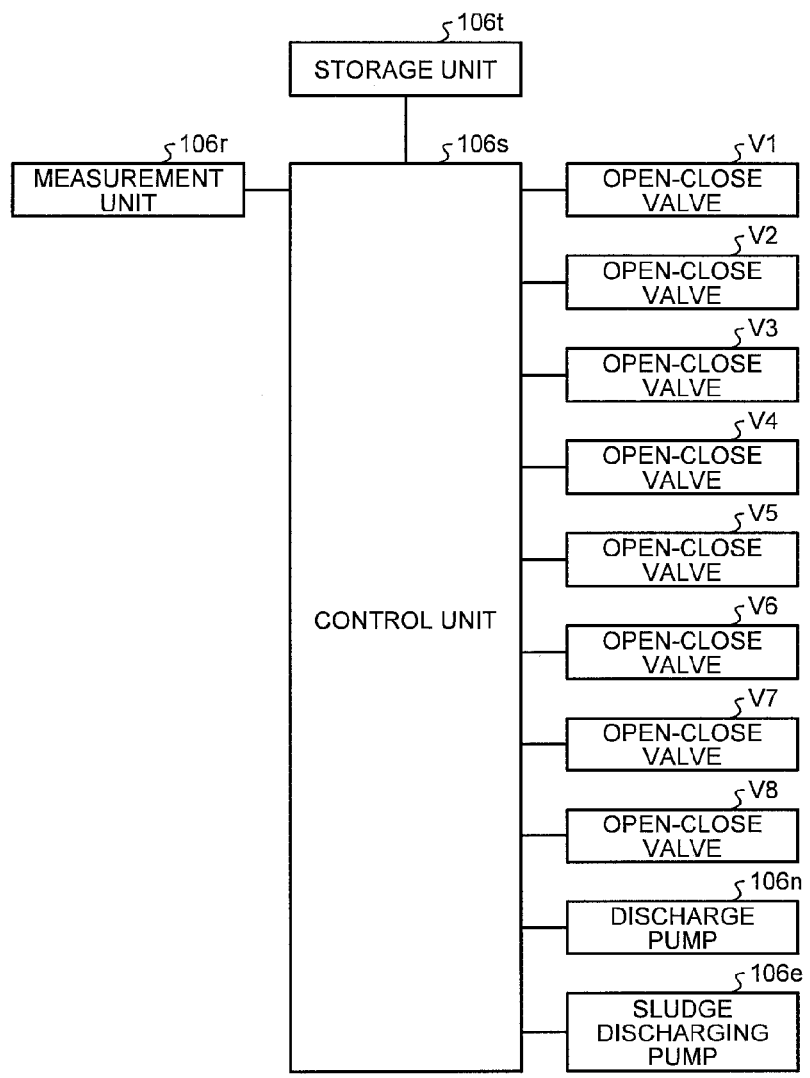
FIG. 8 is a block diagram of a control system of the reclaiming apparatus according to the second embodiment of the present invention.

The control unit 106s is configured by a microcomputer or the like. As illustrated in FIG. 8, a storage unit 106t is disposed in the control unit 106s. The storage unit 106t is configured by a RAM, a ROM, and the like, and a program and data are stored therein. In the storage unit 106t, data of the amount of the absorbent component that is included in the absorbent 1003 (lean solution 1003a) stored in the airtight container 106a is stored for operating the reclaiming apparatus. In the data, for example, the amount of the absorbent component included in the absorbent 1003 (lean solution 1003a) is set to 5 [wt %]. This setting is an index that represents the amount of decrease in the absorbent component from the absorbent 1003 (lean solution 1003a) that is stored in the airtight container 106a and may be arbitrarily set. The measurement unit 106r, the open-close valves V1 to V8, and the pumps 106e and 106n are connected to the control unit 106s. The control unit 106s controls the overall operation of the open-close valves V1 to V8 and the pumps 106e and 106n described above based on density information input from the measurement unit 106r in accordance with a program and data that are stored in the storage unit 106t in advance.

Figure 9:
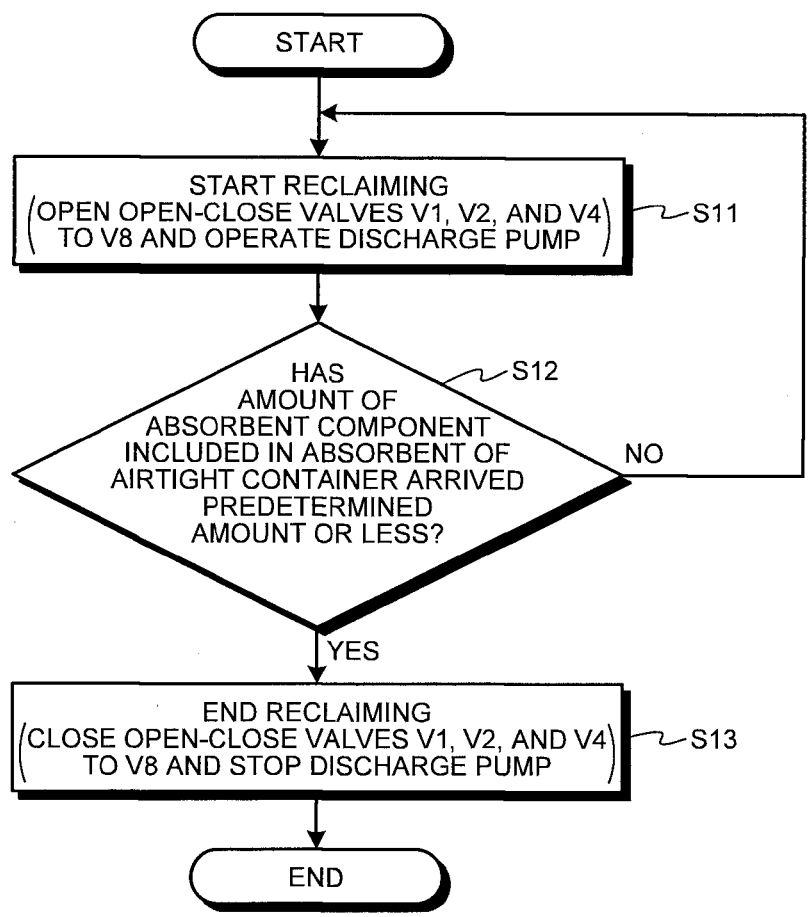
FIG. 9 is a flowchart of a control process of the reclaiming apparatus according to the second embodiment of the present invention.

The control unit 106s, as illustrated in FIG. 9, opens the open-close valves V1, V2, and V4 to V8 and operates the discharge pump 106n based on a reclaiming start instruction (Step S11). Accordingly, a part of the absorbent 1003 (lean solution 1003a) arrives at the airtight container 106a from the regenerator 104 and is stored, is heated together with the dilution water 1007 so as to be evaporated, and is returned to the regenerator 104 through the absorbent discharging pipe 106f. In addition, the absorbent 1003 (lean solution 1003a) stored in the airtight container 106a volatilizes by being brought into counterflow contact with the saturated steam 1004c that rises inside the absorbent component extracting unit 106j while flowing down from the nozzle 106k and is returned to the regenerator 104 through the absorbent discharging pipe 106v. As a result, the absorbent component can be separated and extracted from the degraded material. Then, the control unit 106s ends reclaiming by closing the open-close valves V1, V2, and V4 to V8 and stopping the discharge pump 106n in a case where the amount of the absorbent component included in the absorbent 1003 (lean solution 1003a) included in the airtight container 106a becomes a predetermined amount (for example, 5 [wt %]) or less (Yes in Step S12) based on the measurement information that is input from the measurement unit 106r (Step S13). Then, after the reclaiming ends, the sludge 1006 is discharged to the outside of the airtight container 106a by opening the open-close valve V3 and operating the sludge discharging pump 106e.

In this way, the reclaiming apparatus 106 according to the second embodiment described above includes the airtight container 106a that is an absorbent storing unit that stores a part of the absorbent 1003 that has absorbed $CO_2$ included in the exhaust gas 1001 and the heating unit that heats the absorbent 1003 that is stored in the airtight container 106a, distributes a part of the absorbent 1003 that is stored in the airtight container 106a, and brings the steam (gaseous body) into counterflow contact with the distributed absorbent 1003.

According to this reclaiming apparatus 106, since the steam is brought into counterflow contact with a part of the absorbent 1003 that is stored in the airtight container 106a, the absorbent component volatilizes and is separated from the degraded material, and accordingly, the absorbent component can be extracted from the degraded material, whereby a loss of the absorbent 1003 can be reduced.

In a general reclaiming apparatus, an absorbent 1003 starts to be heated at about 120 [° C.], and the heating temperature is raised, for example, up to 150 [° C.] in accordance with the concentration frequency of a degraded material. Accordingly, it is necessary to increase the pressure of steam passing through the steam pipe 106g that is a heating unit, and steam having higher pressure is needed in the heating source. In addition, there is concern that alkanolamine that is the absorbent component of the absorbent 1003 may be degraded by the heat that is accompanied with an increase in the heating temperature. Against such a problem, according to the reclaiming apparatus 106 of the second embodiment, since the absorbent component is separated from the degraded material by bringing the absorbent 1003 that is stored in the airtight container 106a and the steam into counterflow contact with each other, the degraded material is concentrated, the heating temperature for concentrating the degraded material is suppressed, and an increase in the pressure of the heating unit is suppressed, whereby the pressure of the steam of the heating source can be suppressed. In addition, since the heating temperature is suppressed, the amount of the absorbent component that is degraded by heating can be decreased. Furthermore, the degraded material can be concentrated with the heating temperature of the heating unit suppressed, and accordingly, the efficiency of the operation of concentrating the degraded material is improved, whereby the size of the reclaiming apparatus 106 can be decreased.

In addition, the reclaiming apparatus 106 of the second embodiment includes: the absorbent distributing unit 11 that extracts and distributes a part of the absorbent 1003 that is stored in the airtight container 106a; the steam supplying unit 21 that supplies steam that is generated outside the reclaiming apparatus; and the absorbent component extracting unit 106j that brings the absorbent 1003 extracted by the absorbent distributing unit 11 into counterflow contact with the steam of the steam supplying unit 21.

According to this reclaiming apparatus 106, differently from the first embodiment described above, by using the saturated steam 1004c that is generated outside the reclaiming apparatus 106, that is, steam that does not include amine that is an absorbent component, the efficiency of separating the absorbent component from the degraded material can be improved.

Furthermore, the reclaiming apparatus 106 according to the second embodiment further includes the packed bed 106p that brings the absorbent 1003 that is distributed by the absorbent distributing unit 1 and the steam into gas-liquid contact.

According to this reclaiming apparatus 106, it is possible to promote the separation of the absorbent component from the degraded material that is included in the absorbent 1003.

In addition, in the reclaiming apparatus 106 according to the second embodiment, the absorbent distributing unit 11 includes the discharge pump 106n that extracts a part of the absorbent 1003 from the airtight container 106a and pumps up the extracted part and the nozzle 106k that allows the absorbent 1003 that is pumped up by the discharge pump 106n to flow down against the steam that rises.

According to this reclaiming apparatus 106, a counterflow contact between the absorbent 1003 that is stored in the airtight container 106a and the steam can be appropriately performed.

In addition, the reclaiming apparatus 106 of the second embodiment further includes the measurement unit 106r that measures the amount of the absorbent component included in the absorbent 1003 that is stored in the airtight container 106a and the control unit 106s that ends the reclaiming when the amount of the absorbent component that is acquired from the measurement unit 106r arrives at a predetermined amount or less.

According to this reclaiming apparatus 106, the reclaiming is ended based on the amount of the absorbent component included in the absorbent 1003 that is stored in the airtight container 106a, whereby the absorption function according to the absorbent 1003 can be constantly maintained in a stable state.

In addition, in the reclaiming apparatus 106 described above, the open-close valves V1, V2, and V4 to V8 are opened, and the discharge pump 106n is operated when the reclaiming is started. Accordingly, the heating and evaporating of the absorbent 1003 (lean solution 1003a) and the volatilization of the absorbent component are performed at the same time, whereby the efficiency of the reclaiming operation can be improved.

Furthermore, in the reclaiming apparatus 106 described above, after the absorbent 1003 (lean solution 1003a) is heated and evaporated with the open-close valves V1, V2, V4, and V5 opened at the time of starting the reclaiming, the absorbent component may be volatilized by opening the open-close valves V6 to V8 and operating the discharge pump 106n. Accordingly, for example, after an absorbent 1003 that contains 30 [wt %] of the absorbent component at the time of heating the absorbent 1003 (lean solution 1003a) is heated and evaporated, a heat-stable salt is concentrated as an absorbent 1003 that contains 5 [wt %] of the absorbent component, the concentrated absorbent 1003 is brought into counterflow contact with the steam, and, accordingly, the amount of the absorbent component that volatilizes increases, whereby the separation efficiency of the absorbent component from the degraded material can be improved.

A reclaiming method according to the second embodiment includes a process of storing a part of an absorbent 1003 that has absorbed $CO_2$ included in an exhaust gas 1001 and a process of heating the stored absorbent 1003 and includes a process of bringing a part of the stored absorbent 1003 into counterflow contact with steam (gaseous body) while distributing it.

According to this reclaiming method, since the steam is brought into contact with a part of the stored absorbent 1003, an absorbent component volatilizes and is separated from a degraded material, and accordingly, the absorbent component can be extracted from the degraded material, whereby a loss of the absorbent 1003 can be reduced.

In a general reclaiming method, the absorbent 1003 starts to be heated at about 120 [° C.], and the heating temperature is raised, for example, up to 150 [° C.] in accordance with the concentration frequency of the degraded material. Accordingly, it is necessary to increase the pressure of steam passing through the steam pipe 106*g* that is a heating unit, and steam having higher pressure is needed in the heating source. In addition, there is concern that alkanolamine that is the absorbent component of the absorbent 1003 may be degraded by the heat that is accompanied with an increase in the heating temperature. Against such a problem, according to the reclaiming method of the second embodiment, since the absorbent component is separated from the degraded material by bringing the stored absorbent 1003 and the steam into counterflow contact with each other, the degraded material is concentrated, the heating temperature for concentrating the degraded material is suppressed, and an increase in the pressure of the heating unit is suppressed, whereby the pressure of the steam of the heating source can be suppressed. In addition, since the heating temperature is suppressed, the amount of the absorbent component that is degraded by heating can be decreased. Furthermore, the degraded material can be concentrated with the heating temperature of the heating unit suppressed, and accordingly, the efficiency of the operation of concentrating the degraded material is improved, whereby the size of the reclaiming apparatus can be decreased.

In addition, the reclaiming method according to the second embodiment includes a process of extracting and distributing a part of the stored absorbent 1003 and a process of bringing the saturated steam 1004*c* that is externally generated into counterflow contact with the extracted absorbent 1003.

According to this reclaiming method, differently from the first embodiment described above, by using the saturated steam 1004*c* generated outside the reclaiming apparatus 106, that is, steam that does not include amine that is an absorbent component, the efficiency of separating the absorbent component from the degraded material can be improved.

In addition, the reclaiming method of the second embodiment includes a process of sampling the stored absorbent 1003 and measuring the amount of the absorbent component included in the absorbent 1003 and a process of ending the reclaiming in a case where the measured amount of the absorbent component arrives at a predetermined amount or less.

According to the reclaiming method, by ending the reclaiming based on the amount of the absorbent component that is included in the stored absorbent 1003, the absorption function according to the absorbent 1003 can be constantly maintained in a stable state.

In the reclaiming method of the second embodiment, the process of heating the stored absorbent 1003 includes a process of performing heat exchange between the absorbent 1003 and steam in a non-contact manner and maintaining the pressure of the steam at predetermined pressure (for example, 2 to 3 [kg/cm$^2$G]).

According to this reclaiming method, as described above, an increase in the pressure of the heating unit is suppressed, and accordingly, by maintaining the pressure of the steam used for heating the stored absorbent 1003 at predetermined pressure, the pressure of the steam of the heating source can be maintained to be constant, and accordingly, the amount of the absorbent component that is degraded by heating decreases, and a decrease in the size of the reclaiming apparatus can be realized.

Third Embodiment

A reclaiming apparatus according to a third embodiment is applied to a recovery apparatus that has the same main configuration as that of the above-described the first embodiment and is different from the reclaiming apparatus of the first embodiment in which a dry steam supplying unit is further included. Thus, in the third embodiment to be described below, description of the recovery apparatus will not be presented, the same reference numeral is assigned to a configuration of the reclaiming apparatus that is equivalent to that of the first embodiment, and description thereof will not be presented.

Figure 10:
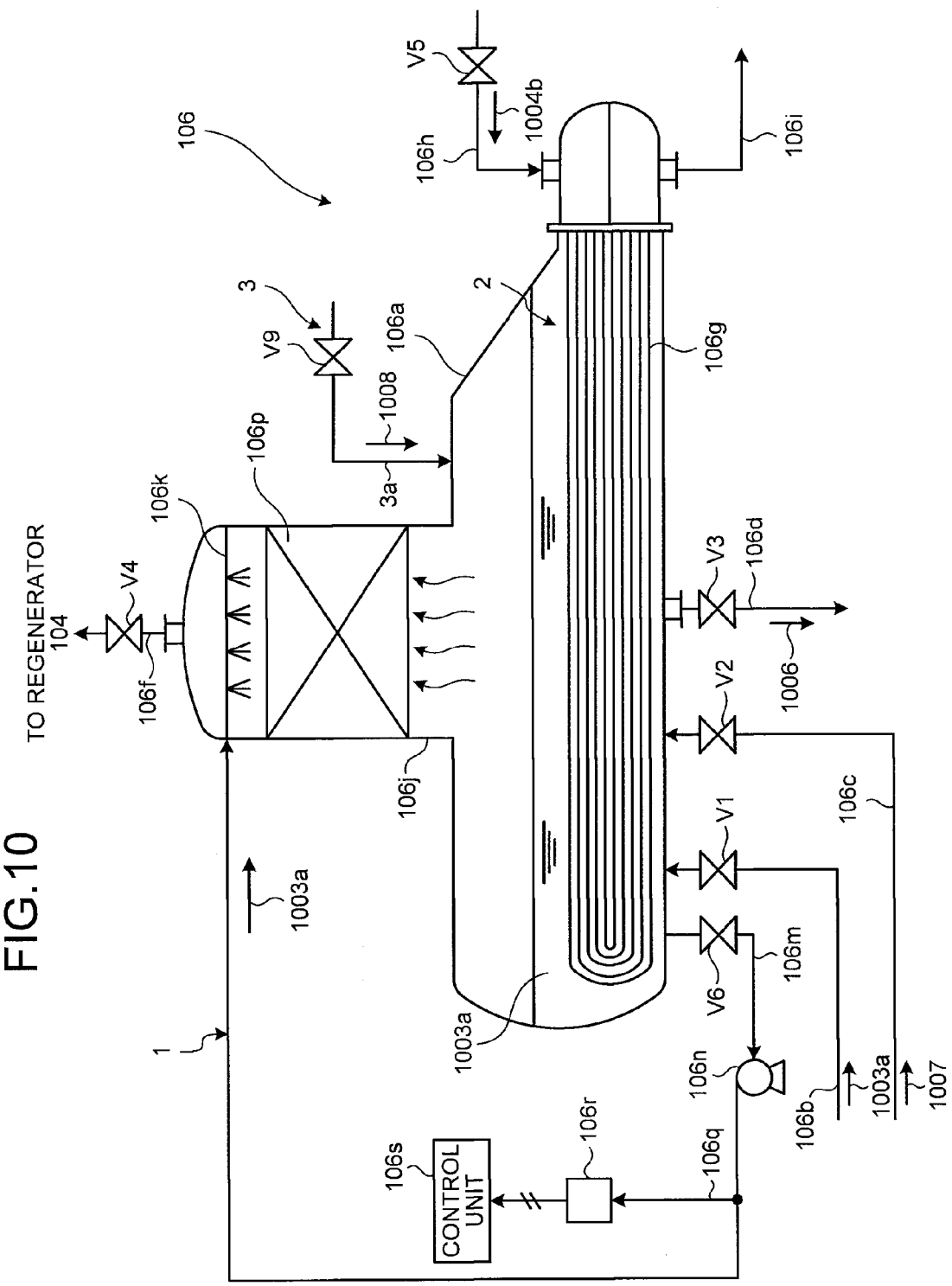
FIG. 10 is a schematic diagram of a reclaiming apparatus according to a third embodiment of the present invention.

FIG. 10 is a schematic diagram of the reclaiming apparatus according to the third embodiment of the present invention. As illustrated in FIG. 10, the reclaiming apparatus 106 includes an dry steam supplying unit 3. The dry steam supplying unit 3 includes a dry steam introducing pipe 3*a* and an open-close valve V9. The dry steam introducing pipe 3*a* is connected to an upper part of an airtight container 106*a* and introduces dry steam 1008 into the inside of the airtight container 106*a*. This dry steam introducing pipe 3*a*, although not illustrated in the diagram, is connected to a steam turbine that is disposed in a power generating facility such as a thermal power plant to which a combustion exhaust gas (exhaust gas) is recovered by the above-described recovery apparatus. In other words, the dry steam 1008 that is introduced into the inside of the airtight container 106*a* by the dry steam introducing pipe 3*a* is bled from the steam turbine. This dry steam 1008 is low-pressure steam of about 1 [kg/cm G] at a temperature in the range of 200 [° C.] to 250 [° C.]. The open-close valve V9 is disposed in the dry steam introducing pipe 3*a* and introduces or stops introduction of the dry steam 1008 by being opened or closed.

As the reclaiming apparatus 106 opens the open-close valve V6 and operates the discharge pump 106*n*, a part of the lean solution 1003*a* containing a degraded material is supplied to the nozzle 106*k* from the airtight container 106*a* through the absorbent discharging pipe 106*m* and is injected into the inside of the absorbent component extracting unit 106*j* from the nozzle 106*k* and flows down.

In other words, an absorbent distributing unit 1 forming a circulation mechanism is configured by the absorbent discharging pipe 106*m*, the open-close valve V6, the discharge pump 106*n*, and the nozzle 106*k*, which returns a part of the CO$_2$ absorbent 1003 stored in the airtight container 106*a* that is an absorbent storing unit to the airtight container 106*a* through an absorbent component extracting unit 106*j* while extracting the part of the CO$_2$ absorbent.

Meanwhile, the open-close valve V5 is opened, and the lean solution 1003*a* is heated by letting saturated steam 1004*b* through the steam pipe 106*g*. Then, the lean solution 1003*a* that is stored inside the airtight container 106*a* becomes steam and rises so as to reach the absorbent component extracting unit 106*j*. Then, the steam of the lean solution 1003*a* that has risen is brought into counterflow contact with the lean solution 1003*a* that has flown down from the nozzle 106*k* at the position of a packed bed 106*p*. At this time, by opening the open-close valve V9 of the dry steam supplying unit 3, the dry steam 1008 is introduced into the inside of the airtight container 106*a* through the dry steam introducing pipe 3*a*. The dry steam 1008 rises in the absorbent component extracting unit 106*j* and is brought into counterflow contact with the lean solution 1003*a* that flows down from the nozzle 106*k* at the position of the packed bed 106*p*. The temperature of this dry steam 1008 is higher than a temperature to which the lean solution (absorbent) 1003*a* that is stored inside the airtight container 106*a* is heated.

Then, the lean solution 1003*a* that flows down from the nozzle 106*k* is brought into counterflow contact with the steam of the lean solution 1003*a* that rises from the airtight container 106a, whereby the absorbent component volatilizes. Especially, in this embodiment, the lean solution 1003a that flows down from the nozzle 106k is brought into counterflow contact with the dry steam 1008 that rises from the airtight container 106a, whereby the absorbent component further volatilizes. In other words, as illustrated in FIG. 3(a), the rising steam and the dry steam 1008 arrive at an upper region from a lower region and are brought into counterflow contact with the absorbent 1003 (lean solution 1003a), thereby allowing the absorbent component (amine) included in the gas phase to volatilize from the absorbent 1003 (lean solution 1003a) so as to be extracted. On the other hand, as illustrated in FIG. 3(b), the absorbent 1003 (lean solution 1003a) flowing down arrives at the lower region from the upper region and is brought into counterflow contact with the steam and the dry steam 1008, whereby an absorbent component (amine) included in the liquid phase volatilizes and is separated from the degraded material. In this way, the absorbent component that has volatilized is separated from the degraded material, passes through the open open-close valve V4, and is returned to the regenerator 104 through the absorbent discharging pipe 106f.

As above, the reclaiming apparatus 106 of the third embodiment described above includes the dry steam supplying unit 3 that supplies the dry steam (gaseous body) 1008 having a temperature higher than the temperature, to which the absorbent 1003 (lean solution 1003a) is heated, to the airtight container 106a that is an absorbent storing unit in addition to the reclaiming apparatus 106 of the first embodiment.

According to this reclaiming apparatus 106, since the high-temperature dry steam 1008 is brought into counterflow contact with a part of the absorbent 1003 that is stored in the airtight container 106a, the absorbent component more easily volatilizes and is reliably separated from a degraded material, and accordingly, the absorbent component can be more easily extracted from the degraded material, whereby a loss of the absorbent 1003 can be reduced.

Here, when the saturated steam 1004b that is let through the steam pipe 106g so as to heat the lean solution 1003a disposed inside the airtight container 106a has low pressure (for example, about 3 [kg/cm$^2$G]), the lean solution 1003a may be heated only up to about 150 [° C.], and there is concern that the absorbent component of the lean solution 1003a that has flown from the nozzle 106k cannot sufficiently volatilize. From this point, according to the reclaiming apparatus 106 of this embodiment, the high-temperature dry steam 1008 is brought into counterflow contact with a part of the absorbent 1003 that is stored in the airtight container 106a, whereby the absorbent component can volatilize more easily.

A reclaiming method according to the third embodiment further includes a process of bringing the dry steam (gaseous body) 1008 having a temperature that is higher than the temperature, to which the absorbent 1003 is heated, into contact with the absorbent 1003 of which a part is circulated in addition to the processes of the reclaiming method according to the first embodiment.

According to this reclaiming method, since the dry steam 1008 is brought into counterflow contact with a part of the absorbent 1003 that is stored in the airtight container 106a, the absorbent component more easily volatilizes and is reliably separated from a degraded material, and accordingly, the absorbent component can be more easily extracted from the degraded material, whereby a loss of the absorbent 1003 can be reduced.

As this embodiment, in a case where the dry steam 1008 that is supplied from the dry steam supplying unit 3 is brought into counterflow contact with the lean solution 1003a (absorbent 1003) that flows down from the nozzle 106k, the heating of the lean solution 1003a (absorbent 1003) using the heating unit may be stopped. More specifically, in a case where the lean solution 1003a (absorbent 1003) is heated by the heating unit in advance, and then, the dry steam 1008 supplied from the dry steam supplying unit 3 is brought into counterflow contact with the lean solution 1003a (absorbent 1003) that flows down from the nozzle 106k, the heating of the lean solution 1003a (absorbent 1003) using the heating unit may be stopped.

Fourth Embodiment

A reclaiming apparatus according to a fourth embodiment is applied to a recovery apparatus that has the same main configuration as that of the above-described the first embodiment and is different from the reclaiming apparatus of the second embodiment that a gas supplying unit is included instead of the steam supplying unit 21 of the second embodiment. Thus, in the fourth embodiment to be described below, description of the recovery apparatus will not be presented, the same reference numeral is assigned to a configuration of the reclaiming apparatus that is equivalent to that of the second embodiment, and description thereof will not be presented.

FIG. 11 is a schematic diagram of a reclaiming apparatus according to the fourth embodiment of the present invention. As illustrated in FIG. 11, the reclaiming apparatus 106 includes an gas supplying unit 4. The gas supplying unit 4 includes a gas introducing pipe 4a and an open-close valve V10. The gas introducing pipe 4a is connected to the lower side inside an absorbent component extracting unit 106j that forms an airtight container and introduces an exhaust gas 1001a to the inside of the absorbent component extracting unit 106j. This gas introducing pipe 4a, although not illustrated in the diagram, is connected to the downstream of an exhaust gas blower 102a that sends the exhaust gas 1001 to a cooling tower 102 in the above-described recovery apparatus. In other words, the exhaust gas 1001a that is introduced into the inside of the absorbent component extracting unit 106j by the gas introducing pipe 4a contains $CO_2$ or $H_2S$ and is an exhaust gas 1001 having a high temperature of 120° C. to 130° C. The open-close valve V10 is disposed in the gas introducing pipe 4a and introduces or stops the introduction of the exhaust gas 1001a by being opened or closed.

A gas discharging pipe 106x is connected to the apex of the absorbent component extracting unit 106j. This gas discharging pipe 106x is connected to an exhaust gas pipe 102e that supplies the exhaust gas 1001 cooled by the cooling tower 102 to an absorber 103 in the above-described recovery apparatus. An open-close valve V11 is disposed in the gas discharging pipe 106x.

As the reclaiming apparatus 106 opens the open-close valve V6 and operates the discharge pump 106n, a part of the lean solution 1003a containing a degraded material is supplied to the nozzle 106k from the airtight container 106a through the absorbent discharging pipe 106m and is injected into the inside of the absorbent component extracting unit 106j from the nozzle 106k and flows to the lower side. In other words, an absorbent distributing unit 11 is configured by the absorbent discharging pipe 106m, the open-close valve V6, the discharge pump 106n, and the nozzle 106k, which extracts a part of the $CO_2$ absorbent 1003 stored in the airtight container 106a that is an absorbent storing unit and distributes the extracted part to the absorbent component extracting unit 106j.

Meanwhile, by opening the open-close valve V10, an exhaust gas 1001a is introduced to the lower side inside the absorbent component extracting unit 106j through the gas introducing pipe 4a. The exhaust gas 1001a rises inside the absorbent component extracting unit 106j. Then, the exhaust gas 1001a that has risen is brought into counterflow contact with a lean solution 1003a that flows down from a nozzle 106k at the position of a packed bed 106p.

Then, the lean solution 1003a that flows down from the nozzle 106k is brought into counterflow contact with the exhaust gas 1001a that rises from the absorbent component extracting unit 106j, whereby the absorbent component volatilizes. In other words, when the steam illustrated in FIG. 7(a) is replaced by the exhaust gas, the rising exhaust gas 1001a arrives at an upper region from a lower region and is brought into counterflow contact with the absorbent 1003 (lean solution 1003a), whereby the absorbent component (amine) included in the gas phase is allowed to volatilize from the absorbent 1003 (lean solution 1003a) so as to be extracted. On the other hand, as illustrated in FIG. 7(b), the absorbent 1003 (lean solution 1003a) flowing down arrives at the lower region from the upper region and is brought into counterflow contact with a saturated steam 1004c, whereby an absorbent component (amine) included in the liquid phase volatilizes and is separated from a degraded material. In this way, the absorbent component that has volatilized is separated from the degraded material, passes through the open open-close valve V11, and is returned to the absorber 103 through the gas discharging pipe 106x.

As above, the above-described reclaiming apparatus 106 according to the fourth embodiment includes the airtight container 106a that is an absorbent storing unit that stores a part of the absorbent 1003 that has absorbed $CO_2$ included in the exhaust gas 1001 and a heating unit that heats the absorbent 1003 that is stored in the airtight container 106a, circulates a part of the absorbent 1003 that is stored in the airtight container 106a, and brings the exhaust gas (gaseous body) 1001a that has absorbed $CO_2$ or $H_2S$ into contact with the circulated absorbent 1003.

According to this reclaiming apparatus 106, since an exhaust gas 1001a having a relatively high temperature is brought into counterflow contact with a part of the absorbent 1003 that is stored in the airtight container 106a, the absorbent component volatilizes and is separated from the degraded material, and accordingly, the absorbent component can be extracted from the degraded material, whereby a loss of the absorbent 1003 can be reduced.

In addition, the reclaiming apparatus 106 according to the fourth embodiment includes: the absorbent distributing unit 11 that extracts and distributes a part of the absorbent 1003 that is stored in the airtight container 106a; the gas supplying unit 4 that supplies the exhaust gas 1001a that absorbs $CO_2$ or $H_2S$; and the absorbent component extracting unit 106j that brings the absorbent 1003 extracted by the absorbent distributing unit 11 into counterflow contact with the exhaust gas (gaseous body) 1001a of the gas supplying unit 4.

According to this reclaiming apparatus 106, differently from the first to third embodiments described above, by using the exhaust gas 1001a that is generated outside the reclaiming apparatus 106 and absorbs $CO_2$ or $H_2S$, the absorbent component can be separated from a degraded material.

A reclaiming method according to the fourth embodiment includes a process of storing a part of an absorbent 1003 that has absorbed $CO_2$ included in an exhaust gas 1001 and a process of heating the stored absorbent 1003 and includes a process of bringing a part of the stored absorbent 1003 into counterflow contact with an exhaust gas (gaseous body) 1001a that absorbs $CO_2$ or $H_2S$ while distributing it.

According to this reclaiming method, since an exhaust gas 1001a having a relatively high temperature is brought into counterflow contact with a part of the stored absorbent 1003, the absorbent component volatilizes and is separated from the degraded material, and accordingly, the absorbent component can be extracted from the degraded material, whereby a loss of the absorbent 1003 can be reduced.

In addition, the reclaiming method according to the fourth embodiment includes a process of extracting and distributing a part of the stored absorbent 1003 and a process of bringing the exhaust gas 1001a that absorbs $CO_2$ or $H_2S$ into counterflow contact with the extracted absorbent 1003.

According to this reclaiming method, differently from the first to third embodiments described above, by using the exhaust gas 1001a that is generated outside the reclaiming apparatus 106 and absorbs $CO_2$ or $H_2S$, the absorbent component can be separated from a degraded material.

In addition, in the fourth embodiment, the gas introducing pipe 4a, although not illustrated in the diagram, may be connected to a part of the absorber 103 at which the exhaust gas 1001 is discharged and be disposed so as to introduce the exhaust gas 1001a from which $CO_2$ or $H_2S$ discharged from the absorber 103 is eliminated into the inside of the absorbent component extracting unit 106j in the above-described recovery apparatus.

In addition, in the first to fourth embodiments described above, although the description has been made which relates to the recovery apparatus that recovers $CO_2$ (carbon dioxide) included in the combustion exhaust gas (exhaust gas), as described above, $H_2S$ (hydrogen sulfide) is also included in a coal gasification gas, a synthesis gas, a coke-oven gas, a petroleum gas, a natural gas, and the like. Also, in a case where $H_2S$ (hydrogen sulfide) is absorbed in the absorbent, the reclaiming apparatuses and the reclaiming methods described above can be applied.

In the first to fourth embodiments described above, although it is more preferable that the absorbent flowing down and the steam are brought into counterflow contact with each other, the form of the counterflow contact is not limited to be in the vertical direction but may be in a horizontal direction or an oblique direction. In addition, the counterflow contact is a contact of the steam made by opposing the distribution direction of the absorbent in the opposite direction, and the steam may not completely oppose the distribution direction of the absorbent.

Example

In this example, absorbent components included in sludge, which is a concentrated waste, discharged from reclaiming were tested (see FIG. 12).

According to this experiment, in a conventional example, the above-described reclaiming apparatus was not applied, and an absorbent component included in sludge that is discharged from reclaiming was 7.3 [wt %]. Here, for the recovery apparatus, the reclaiming was performed several times per year, and the amount of discharged sludge for performing reclaiming once was 19 [Ton]/one time. In addition, the number of times of performing the reclaiming for one year was 3.8 times/year. An annual amount of loss of the absorbent according to the absorbent component included in the sludge was 5,993 [kg]/year, and a loss amount ratio of the absorbent component included in the sludge to the whole absorbent was 14.8 [%].

On the other hand, in the example, the above-described reclaiming apparatus was applied, and the absorbent component that is included in the sludge was 1.0 [%]. In addition, an annual amount of loss of the absorbent according to an absorbent component included in the sludge was 820 [kg]/year. Accordingly, the amount of decrease in the loss of the absorbent for one year was 5,173 [kg]/year, and an annual reduction ratio of the absorbent was 12.7 [%].

As a result thereof, as illustrated in FIG. 12, it can be understood that the absorbent component and the degraded material are further separated from each other so as to decrease the loss of the absorbent in this example.

REFERENCE SIGNS LIST 1, 11 Absorbent distributing unit
2, 21 Steam supplying unit
3 Dry steam supplying unit
3a Dry steam introducing pipe
4 Gas supplying unit
4a Gas introducing pipe
101 Industrial facility
102 Cooling tower
102a Exhaust gas blower
102b Humidification cooling water circulating pump
102c Cooling water pipe
102d Cooler
102e Exhaust gas pipe
103 Absorber
103a Absorbent supplying pump
103b Lean solution pipe
103c Cooler
104 Regenerator
104a Absorbent discharging pump
104b Rich solution pipe
104c Regenerating heater
104d Circulating water pump
104e Circulating current pipe
104f Regenerator circulating current cooler
104g $CO_2$ separator
104h Recovered $CO_2$ discharging pipe
105 Rich-lean heat exchanger
106 Reclaiming apparatus
106a Airtight container
106b Discharge pipe
106c Water supplying pipe
106d Sludge discharging pipe
106e Sludge discharging pump
106f Absorbent discharging pipe
106g Steam pipe
106h Steam supplying pipe
106i Steam discharging pipe
106j Absorbent component extracting unit
106k Nozzle
106m Absorbent discharging pipe
106n Discharge pump
106p Packed bed
106q Recovery unit
106r Measurement unit
106s Control unit
106t Storage unit
106v Absorbent discharging pipe
106w Steam introducing pipe
106x Gas discharging pipe
1001, 1001a Exhaust gas
1002 Cooling water
1003 Absorbent
1003a Lean solution
1003b Rich solution
1004a, 1004b, 1004c Saturated steam
1005 Circulating water
1006 Sludge
1007 Dilution water
1008 Dry steam
V1, V2, V3, V4, V5, V6, V7, V8, V9, V10, V11 Open-close valve

The invention claimed is:

1. A reclaiming system comprising:
an absorber that eliminates $CO_2$ or $H_2S$ in an exhaust gas by absorbing $CO_2$ or $H_2S$ into an absorbent;
a regenerator that releases absorbed $CO_2$ or $H_2S$ from the absorbent discharged from the absorber; and
a reclaiming apparatus that reclaims a degraded material that remains in the absorbent discharged from the regenerator, wherein
the reclaiming apparatus includes:
an absorbent storing unit that includes an airtight container to store a part of the absorbent discharged from the regenerator;
a heating unit that heats the absorbent stored in the absorbent storing unit;
an absorbent distributing unit that forms a circulation mechanism that extracts a part of the absorbent stored in the absorbent storing unit and returns the extracted part to the absorbent storing unit for distribution;
a steam supplying unit that generates steam from the absorbent that is heated by the heating unit;
an absorbent component extracting unit that is disposed in the absorbent storing unit and brings the absorbent that is returned to the absorbent storing unit in counterflow contact with the steam of the steam supplying unit; and
a dry steam supplying unit that is connected to an upper part of the airtight container and supplies dry steam having a temperature higher than a temperature to which the absorbent is heated to the absorbent storing unit, wherein the dry steam supplying unit is disposed above a liquid level of the absorbent stored in a lower part of the airtight container stored in the lower part of the airtight container,
wherein a part of the absorbent stored in the absorbent storing unit is distributed, and a gaseous body is brought into counterflow contact with the distributed absorbent.

2. The reclaiming system according to claim 1, wherein the reclaiming apparatus further includes:
an absorbent distributing unit that extracts and distributes a part of the absorbent that is stored in the absorbent storing unit;
a steam supplying unit that supplies steam generated outside the reclaiming apparatus; and
an absorbent component extracting unit that brings the absorbent extracted by the absorbent distributing unit in counterflow contact with the steam of the steam supplying unit.

3. The reclaiming system according to claim 1, wherein the reclaiming apparatus further includes:
an absorbent distributing unit that extracts and distributes a part of the absorbent that is stored in the absorbent storing unit;
a gas supplying unit that supplies the gas in which $CO_2$ or $H_2S$ is absorbed; and
an absorbent component extracting unit that brings the absorbent extracted by the absorbent distributing unit in counterflow contact with the gas of the gas supplying unit.

4. The reclaiming system according to claim 1, wherein the reclaiming apparatus further includes a packed bed that brings the absorbent and the steam in gas-liquid contact with each other.

5. The reclaiming system according to claim 1, wherein the reclaiming apparatus further includes:
- a pump that extracts and raises a part of the absorbent from the absorbent storing unit; and
- a nozzle that causes the absorbent pumped up by the pump to flow down against the steam that rises.

6. A reclaiming method comprising:
- eliminating $CO_2$ or $H_2S$ in an exhaust gas by absorbing $CO_2$ or $H_2S$ into an absorbent;
- releasing absorbed $CO_2$ or $H_2S$ from the absorbent after eliminating; and
- reclaiming a degraded material that remains in the absorbent after releasing, wherein the reclaiming includes
- storing a part of the absorbent;
- heating the stored absorbent;
- bringing a part of the stored absorbent into counterflow contact with a gaseous body while the part is distributed;
- distributing the absorbent by circulating a part of the stored adsorbent solution;
- bringing steam of the heated absorbent and the circulated absorbent into counterflow contact with each other;
- supplying dry steam above a liquid level of the stored absorbent, and
- bringing the absorbent, of which a part is circulated, in counterflow contact with the dry steam having a temperature higher than a temperature to which the absorbent is heated.

7. The reclaiming method according to claim 6, wherein the reclaiming further includes:
- extracting and distributing a part of the stored absorbent; and
- bringing steam that is externally generated into counterflow contact with the extracted absorbent.

8. The reclaiming method according to claim 6, wherein the reclaiming further includes:
- extracting and distributing a part of the stored absorbent; and
- bringing the gas in which $CO_2$ or $H_2S$ is absorbed in counterflow contact with the extracted absorbent.

9. The reclaiming method according to claim 6, wherein the reclaiming further includes:
- measuring an amount of an absorbent component included in the absorbent by sampling the stored absorbent; and
- ending the processes in a case where the measured amount of the absorbent component arrives at a predetermined amount or less.

10. The reclaiming method according to claim 6, wherein the heating of the stored absorbent includes maintaining a pressure of steam at a predetermined pressure by performing heat exchange between the absorbent and the steam in a non-contact manner.

11. The reclaiming method according to claim 10, wherein the pressure of the steam is maintained at 2 to 3 [$kg/cm^2 G$].

* * * * *